US012664095B2

(12) United States Patent
Kirk et al.

(10) Patent No.: US 12,664,095 B2
(45) Date of Patent: Jun. 23, 2026

(54) MEMORY SYSTEM WITH CONTENT-ADDRESSABLE ENTRIES SUPPORTING SCALABLE, LOW OVERHEAD, IN-FLIGHT ESTABLISHMENT AND RETIREMENT OF RESOURCE-BASED LINKED LISTS, AND RELATED METHODS AND COMPUTER-READABLE MEDIA

(71) Applicant: Microsoft Technology Licensing, LLC, Redmond, WA (US)

(72) Inventors: Aaron Kirk, Raleigh, NC (US); Jason Panavich, Raleigh, NC (US); Vikram Arora, Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/670,523

(22) Filed: May 21, 2024

(65) Prior Publication Data

US 2025/0363055 A1 Nov. 27, 2025

(51) Int. Cl.
*G06F 12/08* (2016.01)
*G06F 12/0817* (2016.01)
*G06F 12/0891* (2016.01)

(52) U.S. Cl.
CPC ...... *G06F 12/0824* (2013.01); *G06F 12/0891* (2013.01)

(58) Field of Classification Search
CPC .. G06F 12/08; G06F 12/0891; G06F 12/0824; G06F 12/0802
See application file for complete search history.

(56) References Cited

U.S. PATENT DOCUMENTS 5,995,967 A * 11/1999 Iacobovici .......... G06F 16/9024
6,546,465 B1 * 4/2003 Bertone .............. G06F 12/0828
711/146

(Continued)

FOREIGN PATENT DOCUMENTS

WO WO-2008037201 A1 * 4/2008 ......... G06F 16/9014

OTHER PUBLICATIONS

Timothy Rooney; Michael Dooley, "IP Management Core Tasks," in IP Address Management , IEEE, 2021, pp. 111-162.*

(Continued)

*Primary Examiner* — Pierre Michel Bataille
(74) *Attorney, Agent, or Firm* — Scott Y. Shigeta; Newport IP, LLC

(57) ABSTRACT
A memory system with content-addressable entries supporting scalable, low overhead, in-fight establishment and retirement of resource-based linked lists, and related methods of operation and computer-readable media. The memory system can be used to track and establish an ordering of in-flight instances of access to a resource through a linked-list of content-addressable entries established in the memory system corresponding to such resource. Entries in the memory system that represent instances of access to a given resource can each be established as part of a linked list associated for the given resource to track a priority order for multiple instances of access the resource and then retired when an instance of access has been completed as part of a tracking system, such as to avoid hazards. The memory system provides a way to establish entries in a linked list for in flight instances of access to a resource for ordering and tracking.

21 Claims, 10 Drawing Sheets

(56) References Cited

U.S. PATENT DOCUMENTS

| | | | | |
|---|---|---|---|---|
| 6,823,409 B2 * | 11/2004 | Jones | G06F 12/082 | |
| | | | | 711/146 |
| 10,228,869 B1 * | 3/2019 | Nakibly | G06F 3/065 | |
| 10,521,357 B1 * | 12/2019 | Ramey | G06F 12/1027 | |
| 10,545,887 B2 * | 1/2020 | Mirza | G06F 13/1642 | |
| 2005/0111353 A1 * | 5/2005 | Zievers | G06F 12/0802 | |
| | | | | 711/E12.017 |
| 2013/0311999 A1 * | 11/2013 | Fetterman | G06F 9/5011 | |
| | | | | 718/104 |
| 2015/0243357 A1 * | 8/2015 | Sanzone | G06F 13/1657 | |
| | | | | 711/108 |
| 2018/0314460 A1 * | 11/2018 | Lopez | G06F 15/76 | |
| 2019/0108031 A1 * | 4/2019 | Gonzalez | G06F 9/3861 | |
| 2021/0303480 A1 * | 9/2021 | Keller | G06F 12/0824 | |
| 2023/0072501 A1 * | 3/2023 | Zhu | G06F 13/1668 | |

OTHER PUBLICATIONS

A. Cristal, J. F. Martinez, J. Llosa and M. Valero, "A case for resource-conscious out-of-order processors," in IEEE Computer Architecture Letters, vol. 2, No. 1, pp. 7-7, Jan. 2003.*

A. Roth, R. Ronen and A. Mendelson, "Dynamic techniques for load and load-use scheduling," in Proceedings of the IEEE, vol. 89, No. 11, pp. 1621-1637, Nov. 2001.*

Extended European Search Report Received in European Application No. 25175683.9, mailed on Oct. 7, 2025, 13 pages.

* cited by examiner

| ADDRESS 110 | | | | | |
|---|---|---|---|---|---|
| ENTRY 102 | 102(0) | 102(1) | 102(2) | ... | 102(N) |
| HEAD POINTER INDICATOR 134 | 1'b0 | 1'b0 | 1'b0 | ... | 1'b0 |
| TAIL POINTER INDICATOR 128 | 1'b0 | 1'b0 | 1'b0 | ... | 1'b0 |
| DEPENDENCY ID INDICATOR 138 | 1'b0 | 1'b0 | 1'b0 | ... | 1'b0 |
| DEPENDENCY ID 136 | X | X | X | ... | X |

137(0)   137(1)   137(2)   137(N)

200A

| ADDRESS 110 | "A" | | | | |
|---|---|---|---|---|---|
| ENTRY 102 | 102(0) | 102(1) | 102(2) | ... | 102(N) |
| HEAD POINTER INDICATOR 134 | 1'b1 | 1'b0 | 1'b0 | ... | 1'b0 |
| TAIL POINTER INDICATOR 128 | 1'b1 | 1'b0 | 1'b0 | ... | 1'b0 |
| DEPENDENCY ID INDICATOR 138 | 1'b0 | 1'b0 | 1'b0 | ... | 1'b0 |
| DEPENDENCY ID 136 | X | X | X | ... | X |
| | 137(0) | 137(1) | 137(2) | | 137(N) |

FIG. 2B

| ADDRESS 110 | "A" | "A" | | | |
|---|---|---|---|---|---|
| ENTRY 102 | 102(0) | 102(1) | 102(2) | ... | 102(N) |
| HEAD POINTER INDICATOR 134 | 1'b1 | 1'b0 | 1'b0 | ... | 1'b0 |
| TAIL POINTER INDICATOR 128 | 1'b0 | 1'b1 | 1'b0 | ... | 1'b0 |
| DEPENDENCY ID INDICATOR 138 | 1'b0 | 1'b1 | 1'b0 | ... | 1'b0 |
| DEPENDENCY ID 136 | X | 'h0 | X | ... | X |
| | 137(0) | 137(1) | 137(2) | | 137(N) |

FIG. 2C

| ADDRESS 110 | "A" | "A" | "A" | | |
|---|---|---|---|---|---|
| ENTRY 102 | 102(0) | 102(1) | 102(2) | ... | 102(N) |
| HEAD POINTER INDICATOR 134 | 1'b1 | 1'b0 | 1'b0 | ... | 1'b0 |
| TAIL POINTER INDICATOR 128 | 1'b0 | 1'b0 | 1'b1 | ... | 1'b0 |
| DEPENDENCY ID INDICATOR 138 | 1'b0 | 1'b1 | 1'b1 | ... | 1'b0 |
| DEPENDENCY ID 136 | X | 'h0 | 'h1 | ... | X |
| | 137(0) | 137(1) | 137(2) | | 137(N) |

FIG. 2D

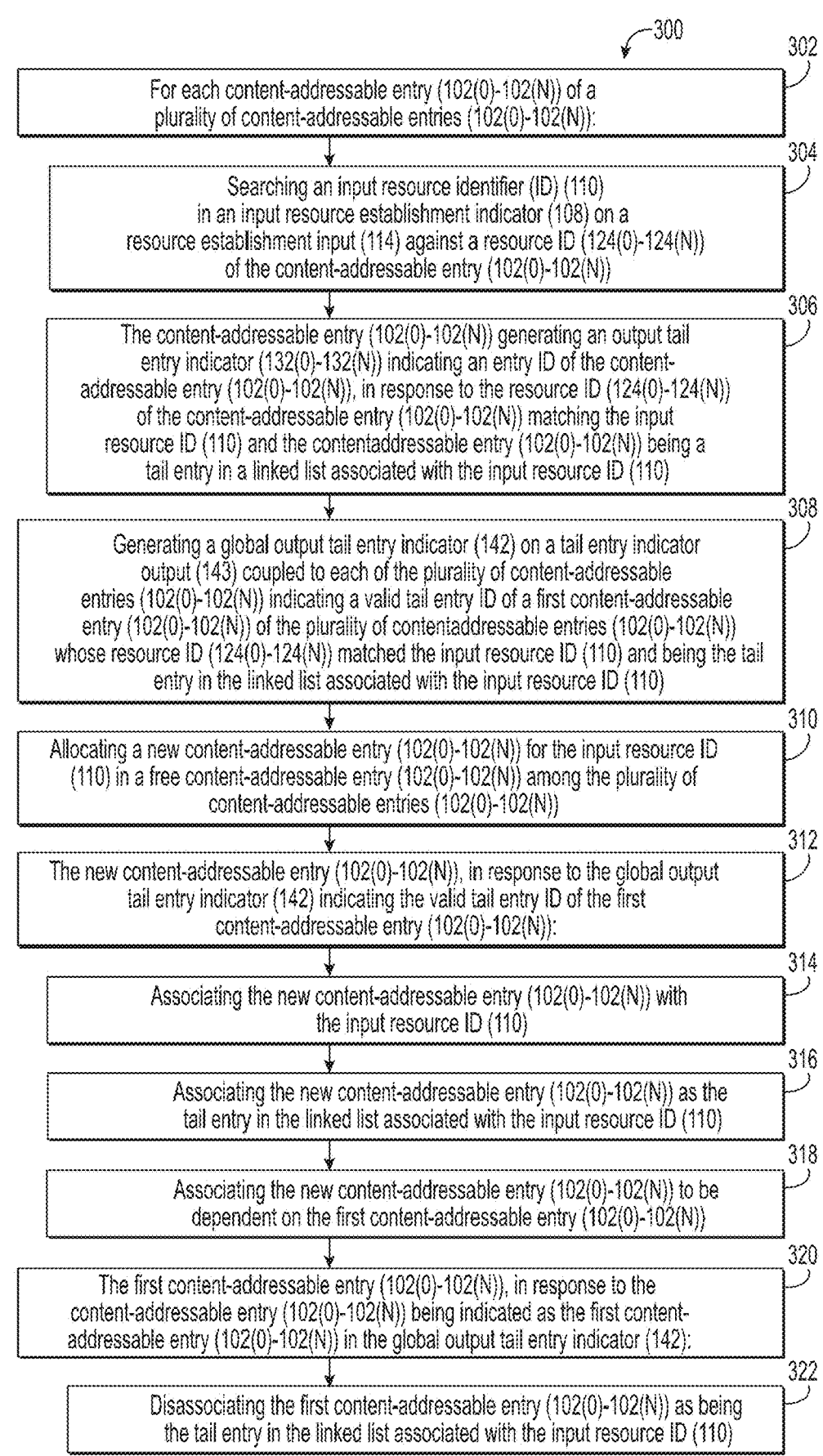

300

302

For each content-addressable entry (102(0)-102(N)) of a
plurality of content-addressable entries (102(0)-102(N)):

304

Searching an input resource identifier (ID) (110)
in an input resource establishment indicator (108) on a
resource establishment input (114) against a resource ID (124(0)-124(N))
of the content-addressable entry (102(0)-102(N))

306

The content-addressable entry (102(0)-102(N)) generating an output tail
entry indicator (132(0)-132(N)) indicating an entry ID of the content-
addressable entry (102(0)-102(N)), in response to the resource ID (124(0)-124(N))
of the content-addressable entry (102(0)-102(N)) matching the input
resource ID (110) and the contentaddressable entry (102(0)-102(N)) being a
tail entry in a linked list associated with the input resource ID (110)

308

Generating a global output tail entry indicator (142) on a tail entry indicator
output (143) coupled to each of the plurality of content-addressable
entries (102(0)-102(N)) indicating a valid tail entry ID of a first content-addressable
entry (102(0)-102(N)) of the plurality of contentaddressable entries (102(0)-102(N))
whose resource ID (124(0)-124(N)) matched the input resource ID (110) and being the tail
entry in the linked list associated with the input resource ID (110)

310

Allocating a new content-addressable entry (102(0)-102(N)) for the input resource ID
(110) in a free content-addressable entry (102(0)-102(N)) among the plurality of
content-addressable entries (102(0)-102(N))

312

The new content-addressable entry (102(0)-102(N)), in response to the global output
tail entry indicator (142) indicating the valid tail entry ID of the first
content-addressable entry (102(0)-102(N)):

314

Associating the new content-addressable entry (102(0)-102(N)) with
the input resource ID (110)

316

Associating the new content-addressable entry (102(0)-102(N)) as the
tail entry in the linked list associated with the input resource ID (110)

318

Associating the new content-addressable entry (102(0)-102(N)) to be
dependent on the first content-addressable entry (102(0)-102(N))

320

The first content-addressable entry (102(0)-102(N)), in response to the
content-addressable entry (102(0)-102(N)) being indicated as the first content-
addressable entry (102(0)-102(N)) in the global output tail entry indicator (142):

322

Disassociating the first content-addressable entry (102(0)-102(N)) as being
the tail entry in the linked list associated with the input resource ID (110)

| ADDRESS 110 | | | | | | |
|---|---|---|---|---|---|---|
| | "A" | "A" | "A" | | | |
| ENTRY 102 | 102(0) | 102(1) | 102(2) | ... | | 102(N) |
| HEAD POINTER INDICATOR 134 | 1'b0 | 1'b1 | 1'b0 | ... | | 1'b0 |
| TAIL POINTER INDICATOR 128 | 1'b0 | 1'b0 | 1'b1 | ... | | 1'b0 |
| DEPENDENCY ID INDICATOR 138 | 1'b0 | 1'b0 | 1'b1 | ... | | 1'b0 |
| DEPENDENCY ID 136 | X | X | 'h1 | ... | | X |
| | 137(0) | 137(1) | 137(2) | | | 137(N) |

FIG. 4

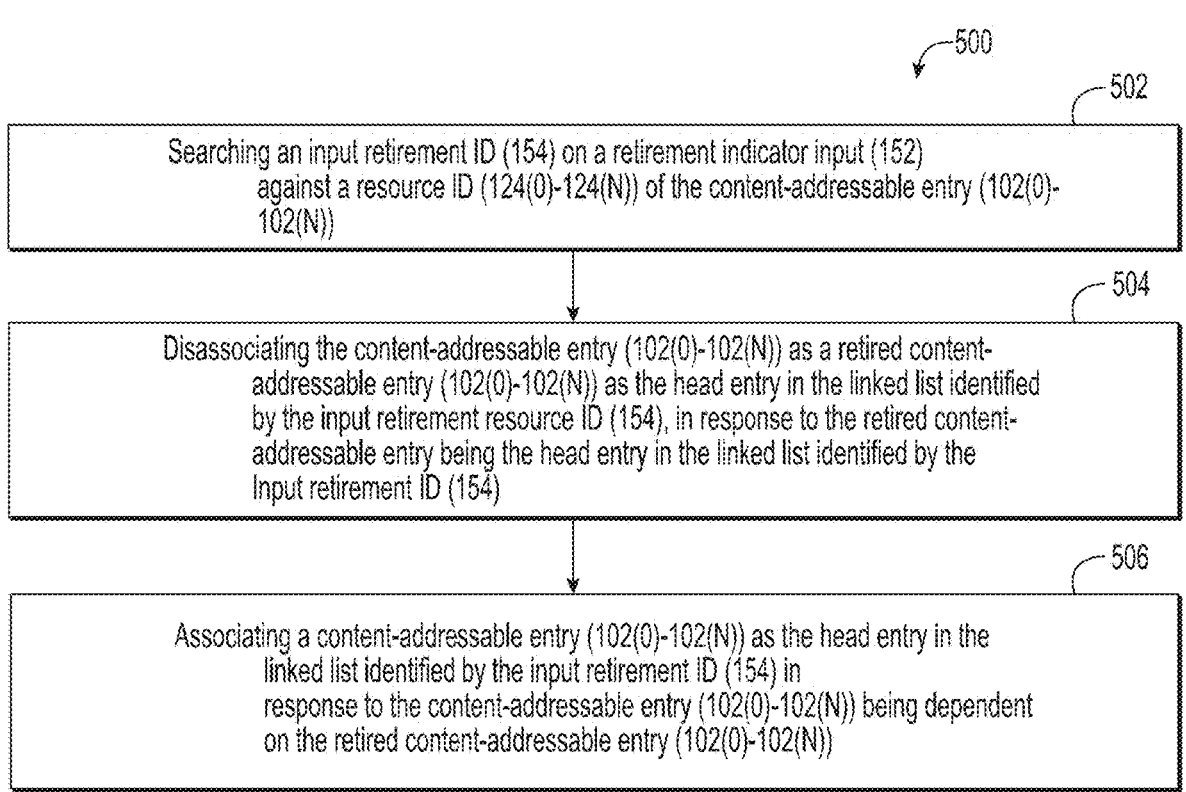

~500

~502

Searching an input retirement ID (154) on a retirement indicator input (152)
against a resource ID (124(0)-124(N)) of the content-addressable entry (102(0)-
102(N))

~504

Disassociating the content-addressable entry (102(0)-102(N)) as a retired content-
addressable entry (102(0)-102(N)) as the head entry in the linked list identified
by the input retirement resource ID (154), in response to the retired content-
addressable entry being the head entry in the linked list identified by the
Input retirement ID (154)

~506

Associating a content-addressable entry (102(0)-102(N)) as the head entry in the
linked list identified by the input retirement ID (154) in
response to the content-addressable entry (102(0)-102(N)) being dependent
on the retired content-addressable entry (102(0)-102(N))

FIG. 5

MEMORY SYSTEM WITH CONTENT-ADDRESSABLE ENTRIES SUPPORTING SCALABLE, LOW OVERHEAD, IN-FLIGHT ESTABLISHMENT AND RETIREMENT OF RESOURCE-BASED LINKED LISTS, AND RELATED METHODS AND COMPUTER-READABLE MEDIA

FIELD OF THE DISCLOSURE

The technology of the disclosure relates generally to memory structures in a processor-based system, and more particularly to memory structures that are configured to preserve an order of address-based commands (e.g., instructions, cache snoops, etc.) relating to the same address as a linked list for in-order processing to avoid memory hazards.

BACKGROUND

Microprocessors, also known as "processors," perform computational tasks for a wide variety of applications. A conventional microprocessor includes a central processing unit (CPU) that includes one or more processor cores, also known as "CPU cores," that execute software/firmware instructions ("instructions"). The software instructions instruct a CPU to perform operations based on data. The CPU performs an operation according to the instructions to generate a result, which is a produced value. The produced value may then be provided as an output to an input/output (I/O) device, or made available (i.e., communicated) as an input value to another consumer instruction executed by the CPU. Thus, the consumer instruction is dependent on the produced value produced by the "producer" instruction as an input value to the consumer instruction for execution. These producer and consumer instructions are also referred to collectively as "dependent instructions."

Modern processors have many instructions in-flight at any moment. Sometimes these instructions have a source and/or target that name or resolve to the same memory address such that these instructions would operate on the same data when executed. Thus, memory hazards can occur if these instructions that are designated to operate on the same data of the servicing of these instructions is not controlled to ensure that each instruction is processed (e.g., scheduled, executed, committed) atomically before the other instructions operating on the same data are processed. Other times, these instructions compete for access to limited resources such as a hardware data buffer or a location in a memory array. In this instance, it still may be desired to control the servicing of such instructions in a particular order to manage their access to such limited resources. One way to ensure fairness is to service instructions in the order in which the requests are made. A common, flexible structure for this purpose is a linked list. A single linked list could be used for ordering access to instructions to an atomic instruction pipeline in a processor. In more complicated cases, multiple linked lists may be needed to ensure a single operation to a specific address has access to different memory locations in different memory arrays. It may be desired to provide a linked list with minimal hardware and associated overhead for ordering instructions for access to an instruction pipeline.

SUMMARY

Exemplary aspects disclosed herein include a memory system with content-addressable entries supporting scalable, low overhead, in-flight establishment and retirement of resource-based linked lists. Related methods of operation and computer-readable media are also disclosed. The memory system can be used to track and establish an ordering of in-flight instances of access to a resource (e.g., a shared resource) through a linked list of content-addressable entries established in the memory system corresponding to such resource. In this manner, the content-addressable entries in the memory system that represent instances of access to a given resource can each be established (i.e., allocated) as part of a linked list associated for the given resource to track a priority order for multiple instances of access to the resource and then retired (i.e., de-allocated) when an instance of access to the resource has been completed as part of a tracking system. Retired content-addressable entries can then be reused to establish new instances of access to a new resource as part of a new linked list in the memory system associated with the new resource. For example, the resource could be a common memory address in which multiple in-flight instructions (i.e., instances of access) in an instruction pipeline in a processor will operate on the same data at the common memory address. As another example, the resource could be a memory address in a cache memory system in which there may be multiple in-flight commands (i.e., instances of access) to snoop the same memory address. In each of these instances, it may be desired to track and order multiple instances of access to the resource to avoid hazards and to otherwise control priority of accesses to the resource. The memory systems disclosed herein provide a way to establish content-addressable entries in a linked list for in-flight instances of access to a resource for ordering and tracking.

In this regard, in exemplary aspects, the memory system comprises a plurality of content-addressable entries that are each content-addressable in parallel to support parallel searching of the content-addressable entries to determine if a linked list is already established for a resource identifier (ID). The memory system is configured to establish new instances of access (e.g., a snoop command for a cache memory address, a write instruction to a memory address) to such resource ID in either an identified existing linked list of content-addressable entries in the memory system associated with the identified resource ID or by creation of a new linked list of a content-addressable entry associated with the resource ID. In this manner, external control circuitry outside of the memory system is not required to provide random access and searching into the memory system to establish linked content-addressable entries for new instances of access to a resource to be ordered and tracked. In this regard, the memory system is configured to receive an instance of access for a given resource ID as an input resource establishment indicator from each of the content-addressable entries in the memory system. In response, each content-addressable entry in the memory system is configured to automatically determine if it is associated with the incoming resource ID in the input resource establishment indicator in parallel, and then generate an output tail entry indicator indicating either that no linked list associated with the resource ID exists (e.g., no last entry is associated with the searched resource ID), or identifying the last (i.e., tail) content-addressable entry in an already existing linked list associated with the resource ID (e.g., the tail entry having the tail pointer for the resource ID). The output tail entry indicator for the resource ID is also coupled across all the content-addressable entries in the memory system as a feedback input into the memory system such that a new, available content-addressable entry is automatically established and associated as the tail entry (e.g., identified as the tail pointer) in a linked list for the resource ID. If a linked list associated with the resource ID did not already exist in the memory system, the new content-addressable entry is also associated as the head entry in a new linked list (e.g., identified as the head pointer) for the resource ID.

In this manner, the memory system is configured to automatically establish and add new content-addressable entries associated with a given resource ID to a linked list of content-addressable entries associated the same resource ID for ordering and tracking multiple instances of access to a resource in the memory system. Multiple linked lists each with their own associated resource ID can be established and maintained in the memory system though linking of specific content-addressable entries in the memory system. As an example, the memory system can be coupled to a pipeline or other bus in which in-flight instances of access to resources that are propagated on the pipeline or bus are automatically received as the input resource establishment indicator in the memory system to be searched across the content-addressable entries in the memory system to identify if a linked list exists for a resource ID. In response, content-addressable entries are automatically established in linked lists associated with the resource ID in the memory system for ordering and tracking.

In an example, in order for each content-addressable entry to be able to be associated in a linked list associated with a resource ID, each content-addressable entry can include a resource ID register that can store the resource ID from an incoming input resource establishment indicator. Also, in this example, in order for each content-addressable entry to be able to provide an indication of it is a tail entry for an existing linked list associated with a resource ID, or to be updated as the tail entry for a linked list associated with a resource ID, each content-addressable entry has a tail pointer indicator. For example, the tail pointer indicator may be a register that has a single bit that can be set to indicate whether its respective content-addressable entry is a tail entry (e.g., '1' logic state) or not a tail entry (e.g., '0' logic state). In this manner, as an example, a single bit can be used in each content-addressable entry to track whether it is the tail entry for a linked list in an efficient manner. This also allows each content-addressable entry to be able to be used as a tail entry for a linked list for a given resource ID and to be released and reused. Thus, it is easy to scale the memory system for any number of content-addressable entries desired to be made available to create linked lists associated with respective resource IDs, because the internal resources required to be provided in each content-addressable entry only requires a limited number of bits to provide reduced size data structures. For example, the resource ID register only requires 'X' bit resources, wherein X=$\log_2$ of number of content-addressable entries. As another example, the tail pointer indicator can be a single bit. Thus, if it is desired to scale (e.g., increase) the number of content-addressable entries, these low overhead registers and indicators can be replaced to provide such.

In other exemplary aspects, the memory system is also configured to receive an input resource retirement indicator in response to a next instance of access to a resource completed (e.g., write completed to a memory address as the resource; snoop command completed to a memory address as the resource). In response, the memory system is configured to retire the head content-addressable entry in the linked list associated with the resource ID of the input resource retirement indicator that has been completed (e.g., by deallocating the head entry in the linked list associated with the resource ID and associate a next content-addressable entry in the linked list associated with the resource ID as the head entry). In this regard, each of the content-addressable entries in the memory system is configured to receive an input resource retirement indicator indicating a retirement resource ID to be retired (i.e., de-allocated or removed) for the linked list associated with the retirement resource ID. The content-addressable entries each perform a comparison of the retirement resource ID from the input resource retirement indicator against its entry to identify if it is the head entry in a linked list for the retirement resource ID to be retired, or it is a next entry in a linked list for the searched retirement resource ID that is dependent on the head entry in the linked list for the retirement resource ID to be retired. In response, the head entry (e.g., identified as being the head pointer) in the linked list associated with the retirement resource ID is retired, and in parallel, the next entry in the linked list that is dependent on the head entry in the linked list for the retirement resource ID is changed to be the new head entry (e.g., head pointer) in the linked list associated with the resource ID. In this manner, when a next instance of access to a resource is retired, the memory system is configured to automatically update and repair the linked list associated with the retirement resource ID to continue to track and maintain the remaining order of instances of access to the resource for the resource ID.

Thus, in this regard, the memory system can also be configured such that a new content-addressable entry for a new instance of access to a resource can be established in a linked list that is associated with such resource simultaneously with retiring a new instance of access to the same or another resource. In this manner, the memory system provides an efficient and convenient system for automatically and independently establishing and retiring in-flight instances of access to resources in linked lists associated with their resources.

In another exemplary aspect, the content-addressable entries in the memory system are also each configured to provide an output head entry indicator indicating if a searched resource ID from an input resource establishment indicator against the entry is the head entry of a linked list for the resource ID. In this manner, the memory system is configured to identify which of its content-addressable entries, if any, is a head entry for a linked list that is already established for the resource ID. In this manner, the memory system can be configured to use the input head entry indicator to establish a new instance of access to a resource as the head entry in the linked list for the resource ID. This may be desired if for example, it is desired that a new instance of access to a resource should be placed first in order in the linked list associated with the resource ID. Also in this example, the content-addressable entries in the memory system are configured such that if its content-addressable entry was the head entry associated with the resource ID, it becomes a next dependent entry on the new head entry in the linked list associated with the resource ID. This is so that the remaining order of instances of access to the resource in the linked list associated with the resource ID in the memory system is maintained.

In this regard, in one exemplary aspect, a memory system is provided. The memory system comprises a plurality of content-addressable entries. Each content-addressable entry of the plurality of content-addressable entries is configured to: (a) search an input resource ID associated with a resource in an input resource establishment indicator on a resource establishment input against a resource ID of the content-addressable entry, and (b) generate an output tail entry indicator indicating an entry ID of the content-addressable entry in response to the resource ID of the content-addressable entry matching the input resource ID and the content-addressable entry being a tail entry in a linked list associated with the input resource ID. The memory system is configured to (c) generate a global output tail entry indicator on a tail entry indicator output coupled to each of the plurality of content-addressable entries indicating a valid tail entry ID of a first content-addressable entry of the plurality of content-addressable entries whose resource ID matched the input resource ID and being the tail entry in the linked list associated with the input resource ID, and (d) allocate a new content-addressable entry for the input resource ID in a free content-addressable entry among the plurality of content-addressable entries. Each content-addressable entry of the plurality of content-addressable entries configured to, in response to the global output tail entry indicator indicating the valid tail entry ID of the first content-addressable entry: (e) associate the new content-addressable entry with the input resource ID; (f) associate the new content-addressable entry as the tail entry in the linked list associated with the input resource ID; and (g) associate the new content-addressable entry to be dependent on the first content-addressable entry. Each content-addressable entry of the plurality of content-addressable entries configured to, in response to the content-addressable entry being indicated as the first content-addressable entry in the global output tail entry indicator: (h) disassociate the first content-addressable entry as being the tail entry in the linked list associated with the input resource ID.

In another exemplary aspect, a method of tracking in-flight instances of access to a resource in a memory system is provided. The method comprises for each content-addressable entry of a plurality of content-addressable entries: searching an input resource ID in an input resource establishment indicator on a resource establishment input against a resource ID of the content-addressable entry; and the content-addressable entry generating an output tail entry indicator indicating an entry ID of the content-addressable entry, in response to the resource ID of the content-addressable entry matching the input resource ID and the content-addressable entry being a tail entry in a linked list associated with the input resource ID. The method also comprises generating a global output tail entry indicator on a tail entry indicator output coupled to each of the plurality of content-addressable entries indicating a valid tail entry ID of a first content-addressable entry of the plurality of content-addressable entries whose resource ID matched the input resource ID and being the tail entry in the linked list associated with the input resource ID. The method also comprises allocating a new content-addressable entry for the input resource ID in a free content-addressable entry among the plurality of content-addressable entries. The method also comprises the new content-addressable entry, in response to the global output tail entry indicator indicating the valid tail entry ID of the first content-addressable entry: associating the new content-addressable entry with the input resource ID; associating the new content-addressable entry as the tail entry in the linked list associated with the input resource ID; and associating the new content-addressable entry to be dependent on the first content-addressable entry. The method also comprises the first content-addressable entry, in response to the content-addressable entry being indicated as the first content-addressable entry in the global output tail entry indicator: disassociating the first content-addressable entry as being the tail entry in the linked list associated with the input resource ID.

In another exemplary aspect, a non-transitory computer-readable medium having stored thereon computer executable instructions is provided. The non-transitory computer-readable medium which, when executed by a processor, causes the processor to, for each content-addressable entry of a plurality of content-addressable entries: search an input resource ID associated with a resource in an input resource establishment indicator on a resource establishment input against a resource ID of the content-addressable entry. The non-transitory computer-readable medium which, when executed by the processor, also causes the processor to, for each content-addressable entry of a plurality of content-addressable entries: generate, by the content-addressable entry, an output tail entry indicator indicating an entry ID of the content-addressable entry, in response to the resource ID of the content-addressable entry matching the input resource ID and the content-addressable entry being a tail entry in a linked list associated with the input resource ID. The non-transitory computer-readable medium which, when executed by a processor, causes the processor to generate a global output tail entry indicator on a tail entry indicator output coupled to each of the plurality of content-addressable entries indicating a valid tail entry ID of a first content-addressable entry of the plurality of content-addressable entries whose resource ID matched the input resource ID and being the tail entry in the linked list associated with the input resource ID; and allocate a new content-addressable entry for the input resource ID in a free content-addressable entry among the plurality of content-addressable entries. The non-transitory computer-readable medium which, when executed by the processor, also causes the processor to cause the new content-addressable entry, in response to the global output tail entry indicator indicating the valid tail entry ID of the first content-addressable entry: associate the new content-addressable entry with the input resource ID; associate the new content-addressable entry as the tail entry in the linked list associated with the input resource ID; and associate the new content-addressable entry to be dependent on the first content-addressable entry. The non-transitory computer-readable medium which, when executed by the processor, also causes the processor to cause the first content-addressable entry, in response to the content-addressable entry being indicated as the first content-addressable entry in the global output tail entry indicator: disassociate the first content-addressable entry as being the tail entry in the linked list associated with the input resource ID.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 2B-2D are tables illustrating exemplary states of the content-addressable entries in the memory system in FIG. 1 when a linked list is established for a resource identifier (ID) of address 'A' in the memory system and the establishment of subsequent content-addressable entries in the linked list also for resource address 'A';

FIG. 3 is a flowchart illustrating an exemplary process of establishing a new instance of access to a resource in a linked list established among linked content-addressable entries in the memory system in FIG. 1 for the resource, based on a resource establishment input indicating a new instance of access to the resource;

FIG. 4 is a table illustrating exemplary states of the content-addressable entries in the memory system in FIG. 1 when a first instance of access to a resource ID of address 'A' in a linked list associated with resource ID of address 'A' in the memory system is retired;

FIG. 5 is a flowchart illustrating an exemplary process of retiring an instance of access to a resource in a linked list among linked content-addressable entries in the memory system in FIG. 1 for the resource, based on an input resource retirement indicator identifying a resource to be retired;

Figure 1:
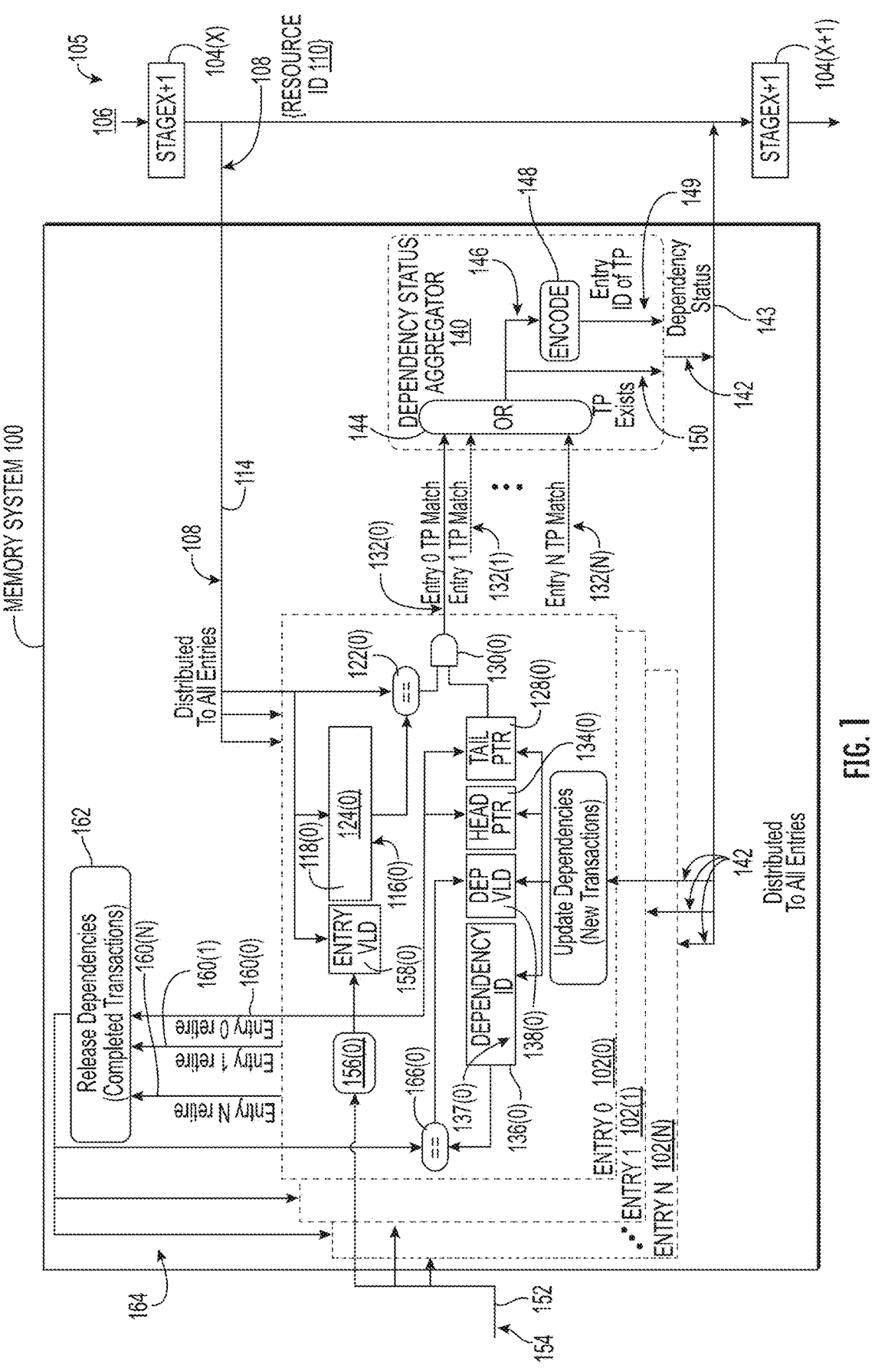
FIG. 1 is a schematic diagram of an exemplary memory system with content-addressable memory entries supporting in-flight establishment and retirement of resource-based linked lists.
Figure 6:
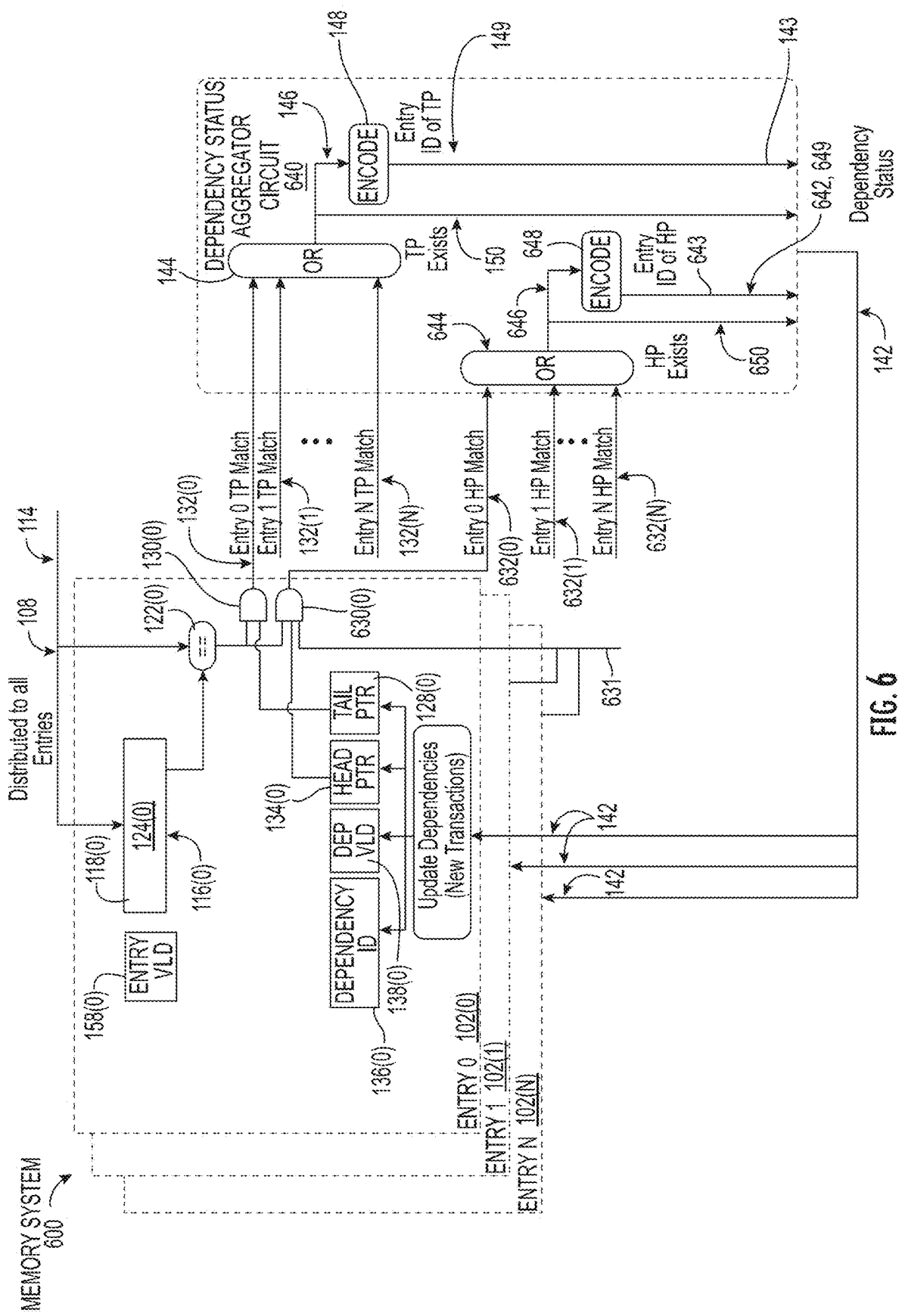
Figure 7:
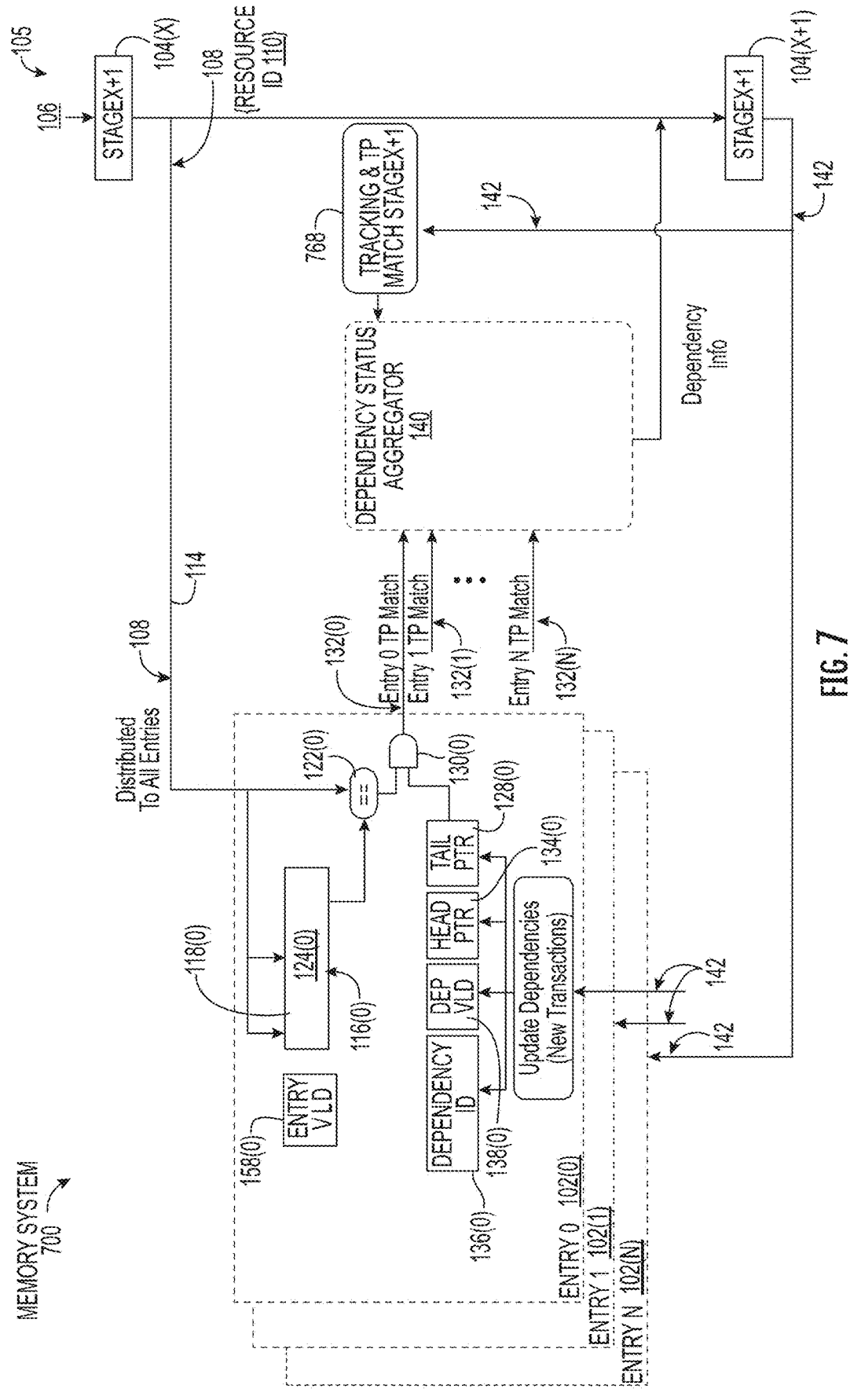
Figure 8:
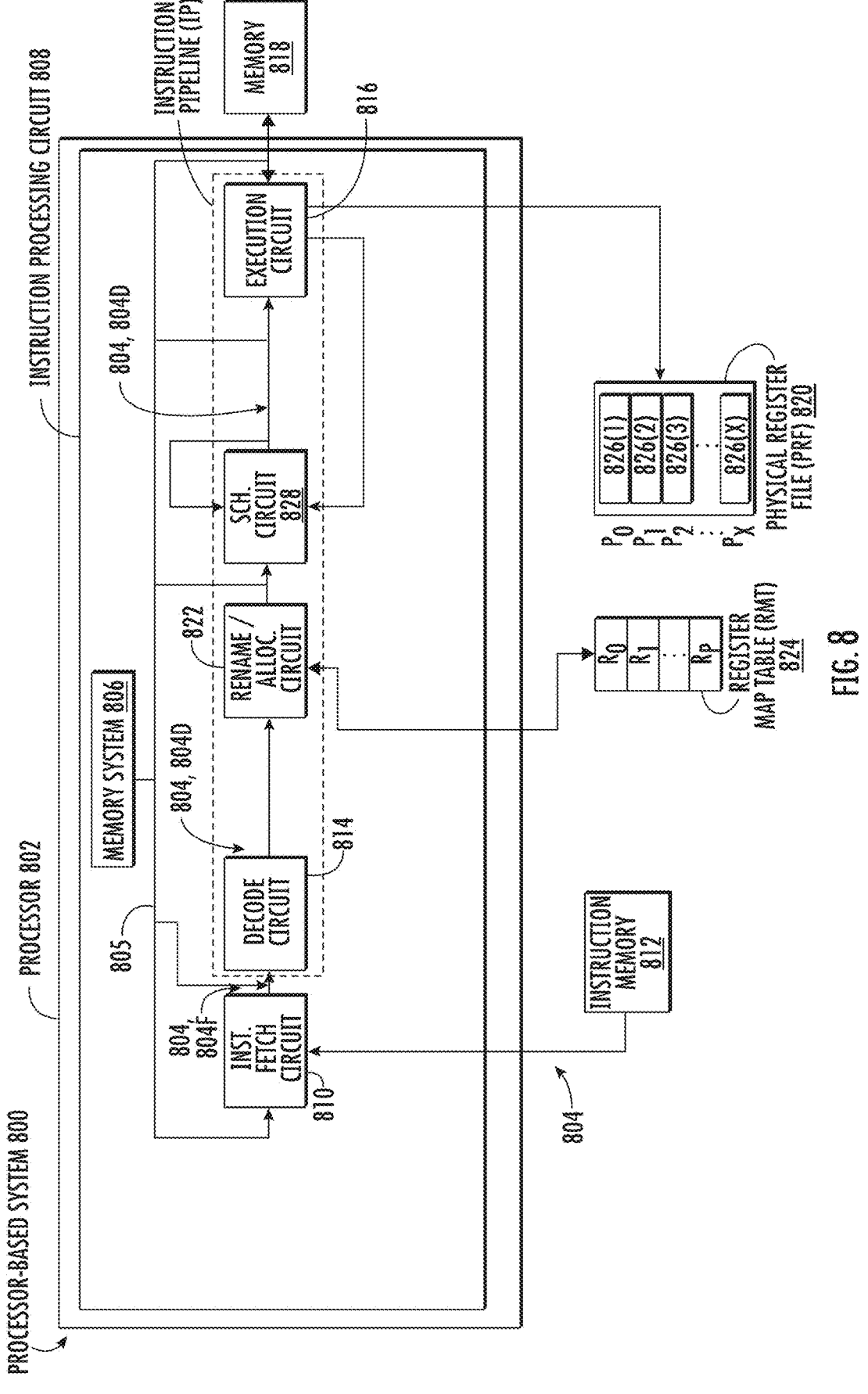
Figure 9:
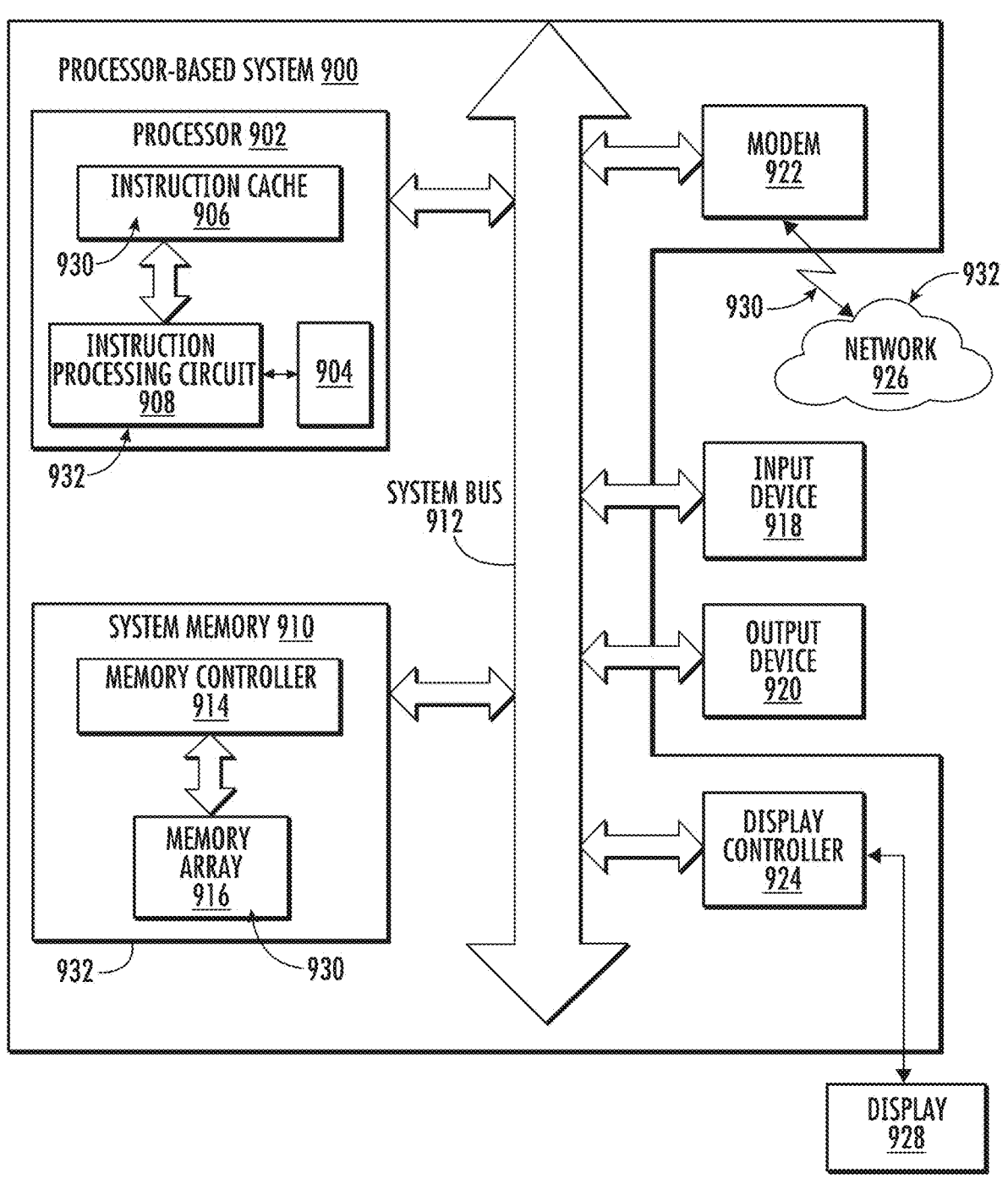

FIG. 6 is a schematic diagram of another exemplary memory system that is similar to the memory system in FIG. 1, but that also includes an additional head entry indicator circuit configured to generate a head entry indicator output indicating a content-addressable entry that is a head entry of an established linked list among the content-addressable entries for the resource indicated in the input resource establishment indicator, for use to set the new instance of access to the resource identified in the received input resource establishment indicator, as the new head entry in the linked list of content-addressable entries associated with the resource;

FIG. 7 is a schematic diagram of another exemplary memory system that is similar to the memory systems in FIG. 1 or 6, but that also includes a stage tracking circuit configured to track updates to be made to content-addressable entries in response to a new instance of access to the resource to be allocated as a new content-addressable entry, to still allow updated searching in the event of latency in updating the content-addressable entries;

FIG. 8 is a schematic diagram of an exemplary processor-based system that includes a processor with an instruction pipeline that has in-flight instructions as instances of access to a shared resource as a memory address, wherein the instruction pipeline can be coupled to the memory system, including, but not limited to, the memory systems in FIGS. 1, 6, and/or 7, to automatically receive such instructions as instances of access to a resource as a memory address for establishing content-addressable entries in a linked list associated with the memory address to order and track such instructions; and FIG. 9 is a block diagram of an exemplary processor-based system that includes a processor and an instruction processing circuit with one or more instruction pipelines for processing computer instructions for execution, wherein the processor-based system can include a memory system, including, but not limited to, the memory systems in FIGS. 1, 6, and/or 7, with content-addressable memory entries supporting in-flight establishment and retirement of resource-based linked lists.

DETAILED DESCRIPTION

FIG. 1 is a schematic diagram of an exemplary memory system 100 with content-addressable memory entries 102

(0)-102((N) (referred to as "content-addressable entries") supporting scalable, low overhead in-flight establishment and retirement of resource-based linked lists, where 'N+1' can represent any number of content-addressable entries desired. For example, the content-addressable entries 102 (0)-102(N) can be memory circuits that include registers, latches, etc. to store information as well as logic circuits to perform comparisons and searches. The memory system 100 can be used to track and establish an ordering of in-flight instances of access to a resource (e.g., a shared resource) through a linked list of the content-addressable entries 102(0)-102((N) established in the memory system 100 corresponding to such resource. In this manner, the content-addressable entries 102(0)-102((N) in the memory system 100 that represent instances of access to a given resource can each be established (i.e., allocated) as part of a linked list associated for the given resource to track a priority order for multiple instances of access to the resource and then retired (i.e., de-allocated) when an instance of access to the resource has been completed as part of a tracking system. Retired content-addressable entries 102(0)-102((N) can then be reused to establish new instances of access to a new resource as part of a new linked list in the memory system 100 associated with the new resource, or become the tail entry of an existing linked list for a new instance of access for a resource that has an existing linked list in the memory system 100. For example, the resource could be a common memory address in which multiple in-flight instructions (i.e., instances of access) in an instruction pipeline in a processor will operate on the same data at the common memory address. As another example, the resource could be a memory address in a cache memory system in which there may be multiple in-flight commands (i.e., instances of access) to snoop the same memory address. In each of these instances, it may be desired to track and order multiple instances of access to the resource to avoid hazards and to otherwise control priority of accesses to the resource. The memory systems disclosed herein provide a way to establish content-addressable entries in a linked list for in-flight instances of access to a resource for ordering and tracking.

In this regard, as shown in FIG. 1, in this example, the memory system 100 is coupled to stages 104(X)-104(X+1) of a circuit, such as an instruction or command pipeline as a staged circuit 105 in a processor to be able to receive transactions 106, each related to a staged instance of access to a resource, that require ordering and tracking. For example, the resource may be a memory address to be accessed by multiple program instructions as part of processing and/or executing the instructions, where access to a common memory address may be a hazard. As another example, the resource may be a memory address to be snooped by a snoop command as part of a cache memory system that may involve multiple devices snooping the same memory address to maintain cache coherency. For example, cache coherency protocols (e.g., AMBA CHI) provide snoop commands for filtering cache transfers and updating of cache states, which can create hazards if performed to the same memory address without being managed atomically.

As discussed in more detail below, the memory system 100 supports in-flight establishment of new instances of access to a resource as part of the transactions 106 in the content-addressable entries 102(0)-102(N) that can be linked together with certain other content-addressable entries 102(0)-102(N) related to the same common resource to establish a linked list of instances of access to the common resource for tracking and ordering purposes. In other words, the memory system 100 supports establishing new instances of access to a resource as part of in-flux and constantly updating new transactions 106. The memory system 100 including the content-addressable entries 102 (0)-102(N), any of which can be linked together, provides for easy scalability of the capacity of the memory system 100. As also discussed in more detail below, the memory system 100 supports retirement of existing instances of access in an established linked list of instances of access to the common resource among the content-addressable entries 102(0)-102(N) so that as instances of access to a resource are completed, the content-addressable entries 102(0)-102(N) are each capable of retirement if their entry is a head entry in the linked list for the retired resource. The establishment mechanisms in the memory system 100 will be first discussed followed by the retirement mechanisms in the memory system 100.

In this regard, with reference to FIG. 1, the memory system 100 is configured to receive an input resource establishment indicator 108 that contains information on the resource to be accessed for establishment in a content-addressable entry 102(0)-102(N) in the memory system 100 for tracking and ordering. Note that exemplary components of content-addressable entry 102(0) are shown in detail in FIG. 1, but other instances of the same components are also present in the other respective content-addressable entries 102(1)-102(N) referenced in the discussion below as elements X(1)-X(N), wherein X is a given component element number. The input resource establishment indicator 108 is in the form of an input resource identifier (ID) 110 (e.g., a memory address, a source ID, or other indicator to identify a resource) that indicates the instance of the resource to be accessed. In this manner, the input resource ID 110 identifies access to a resource (e.g., a write instruction, a snoop command). In this example, the input resource establishment indicator 108 is provided on a resource establishment input 114 that is coupled to each of the content-addressable entries 102(0)-102(N) so that each of the content-addressable entries 102(0)-102(N) can receive the input resource establishment indicator 108 to perform a parallel content search. Each of the content-addressable entries 102(0)-102(N) is configured to search the input resource ID 110 of the input resource establishment indicator 108 to determine if the content-addressable entry 102(0)-102(N) is already associated with a linked list of the content-addressable entries 102(0)-102(N) associated with the input resource ID 110 or not, and then add or create a new linked list related to the input resource ID 110 for tracking and ordering. In this manner, the memory system 100 supports parallel searching of the content-addressable entries 102(0)-102(N) for fast access and to avoid the need for an external access control circuit, such as would be used for random access to memory entries such as a static random access memory (SRAM) system. For example, an SRAM system has restrictions on read and write accesses in that only one memory row can be selected at a time for access.

With continuing reference to FIG. 1, to perform such searching related to the input resource ID 110, each content-addressable entry 102(0)-102(N) in the memory system 100 includes a respective entry tracking register 116(0)-116(N) that includes a resource ID register 118(0)-118(N). Each entry tracking register 116(0)-116(N) is configured to store a received input resource ID 110 if its specific content-addressable entry 102(0)-102(N) was previously allocated. This is to store an instance of access to the resource identified by the input resource ID 110 as part of a linked list associated with the such identified resource. Each content-addressable entry 102(0)-102(N) also includes an entry comparator circuit 122(0)-122(N) that is coupled to the resource establishment input 114 and a respective resource ID register 118(0)-118(N) of its content-addressable entry 102(0)-102(N). Each entry comparator circuit 122(0)-122 (N) is configured to compare a received input resource ID 110 on the resource establishment input 114 to a resource ID 124(0)-124(N) stored in its respective resource ID register 118(0)-118(N) to determine if there is a match between the input resource ID 110 and the resource ID 124(0)-124(N). For example, the resource ID registers 118(0)-118(N) each may only require 'X' bit resources, wherein $X=log_2'N+1'$ (i.e., the number of content-addressable entries 102(0)-102 (N)). Thus, if it is desired to scale (e.g., increase) the number of content-addressable entries 102(0)-102(N), a low overhead resource ID registers 118(0)-118(N) is replicated in the scaled content-addressable entries.

If there is a match, this means that a linked list for the input resource ID 110 is already established in the memory system 100, because one or more content-addressable entries 102(0)-102(N) are associated with the input resource ID 110 being stored in its respective resource ID register 118(0)-118(N). Thus, the new input resource establishment indicator 108 needs to be established in a new, available content-addressable entry 102(0)-102(N) and linked to the existing linked list of other content-addressable entries 102 (0)-102(N) that are also associated with the input resource ID 110.

In this regard, to establish the new input resource establishment indicator 108 in a new, available content-addressable entry 102(0)-102(N) and also link such new, available content-addressable entry 102(0)-102(N) to the existing linked list of other content-addressable entries 102(0)-102 (N) that are also associated with the input resource ID 110, each content-addressable entry 102(0)-102(N) also includes a tail pointer indicator 128(0)-128(N). The tail pointer indicator 128(0)-128(N) indicates if its respective content-addressable entry 102(0)-102(N) is the last or tail entry in a linked list of content-addressable entries 102(0)-102(N) associated with the resource ID 124(0)-124(N) stored in its respective resource ID register 118(0)-118(N). In this manner, the last entry in a linked list associated with the input resource ID 110 can be identified so that a new content-addressable entry 102(0)-102(N) established for the incoming input resource establishment indicator 108 can be linked to the existing last entry of the linked list.

For example, the tail pointer indicator 128(0)-128(N) may be a single bit that can store a first memory state (e.g., logic '0') to indicate its respective content-addressable entry 102(0)-102(N) is not a tail entry in a linked list for its resource ID 124(0)-124(N), and a second, different memory state (e.g., logic '1') to indicate its respective content-addressable entry 102(0)-102(N) is not a tail entry in a linked list for its resource ID 124(0)-124(N). Thus, if it is desired to scale (e.g., increase) the number of content-addressable entries 102(0)-102(N), a low overhead tail pointer indicator 128(0)-128(N) of a single bit can be replicated in the scaled content-addressable entries 102(0)-102(N).

Each content-addressable entry 102(0)-102(N) in this example also includes a tail entry indicator circuit 130(0)-130(N) that is coupled to its respective tail pointer indicator 128(0)-128(N) and the entry comparator circuit 122(0)-122 (N). The tail entry indicator circuit 130(0)-130(N) is configured to indicate if its respective content-addressable entry 102(0)-102(N) is the tail entry for a linked list for the input resource ID 110 that matched the resource ID 124(0)-124(N) stored in its resource ID register 118(0)-118(N). The tail entry indicator circuits 130(0)-130(N) are each configured to generate a respective output tail entry indicator 132(0)-132(N) indicating if its respective content-addressable entry 102(0)-102(N) is the tail entry in a linked list associated with the input resource ID 110 of the input resource establishment indicator 108. For example, if a content-addressable entry 102(0)-102(N) is not the tail entry in a linked list associated with the input resource ID 110 of the input resource establishment indicator 108, a NULL value could be returned on its respective output tail entry indicator 132(0)-132(N). However, if a content-addressable entry 102(0)-102(N) is the tail entry in a linked list associated with the input resource ID 110 of the input resource establishment indicator 108, a hot bit identifying the entry ID (e.g., 0, 1, . . . N) of the matching content-addressable entry 102(0)-102(N) is returned on its respective output tail entry indicator 132(0)-132(N). In other words, in this example, since the entries are content-addressable entries 102(0)-102(N), the output tail entry indicators 132(0)-132(N) are hot bit indicators wherein only one of the output tail entry indicators 132(0)-132(N) should be active or hot to signify the unique entry that is a tail entry of an existing linked list for the input resource ID 110, if such linked list has been established already. If not, none of the output tail entry indicators 132(0)-132(N) will be active (i.e., hot).

Figure 2A:
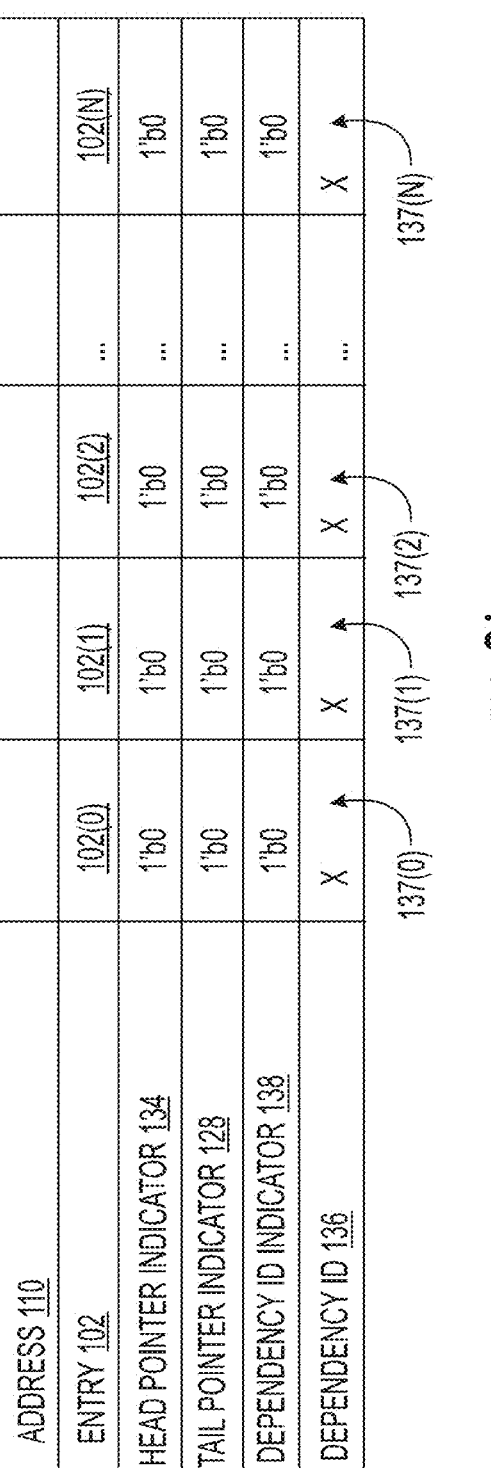
FIG. 2A is a table illustrating an exemplary state of the content-addressable entries in the memory system in FIG. 1 when no linked lists associated with respective resources have yet been established in the memory system.

As will be discussed in more detail below, each content-addressable entry 102(0)-102(N) in this example also includes a respective head pointer indicator 134(0)-134(N) indicating if the entry is a head entry in a linked list for its stored resource ID 124(0)-124(N), a dependency ID register 136(0)-136(N) configured to store a dependency ID 137(0)-137(N) that indicates its entry is dependent on part of the linked list, and a dependency ID valid register 138(0)-138(N) to indicate if a dependency ID 137(0)-137(N) in its dependency ID register 136(0)-136(N) is valid. For example, FIG. 2A has a table 200A that illustrates a starting state of the content-addressable entries 102(0)-102(N). As shown therein, when no content-addressable entries 102(0)-102(N) have yet been established, the head pointer indicators 134(0)-134(N), the tail pointer indicators 128(0)-128(N), the dependency ID registers 136(0)-136(N) and the dependency ID valid registers 138(0)-138(N) are all '0' or in invalid states. As another example, the dependency ID valid registers 138(0)-138(N) can be a single bit. Thus, if it is desired to scale (e.g., increase) the number of content-addressable entries 102(0)-102(N), a low overhead dependency ID valid register 138(0)-138(N) is replicated in the scaled content-addressable entries 102(0)-102(N).

With continuing reference to FIG. 1, as part of establishing a new content-addressable entry 102(0)-102(N) for an incoming input resource establishment indicator 108, the memory system 100 includes a dependency status aggregator circuit 140 that is coupled to each of the output tail entry indicators 132(0)-132(N) generated by the respective content-addressable entries 102(0)-102(N). The dependency status aggregator circuit 140 is configured to generate a global output tail entry indicator 142 on a tail entry indicator output 143 indicating which entry 0-N of the content-addressable entries 102(0)-102(N) is the last entry in a linked list associated with the input resource ID 110 for the incoming input resource establishment indicator 108 to be established. In this regard, in this example, the dependency status aggregator circuit 140 includes a tail entry indicator circuit 144, which is an OR-based logic circuit in this example. The tail entry indicator circuit 144 is configured to aggregate each of the output tail entry indicators 132(0)-132(N) into a combined output tail entry indicator 146 that can then be encoded into a global output tail entry word 149 as an encoded word by an encoder circuit 148. In this manner, in this example, the global output tail entry indicator 142 is an encoded word that identifies which content-addressable entry 102(0)-102(N), if any, is the tail entry in an established linked list for the input resource ID 110. The tail entry indicator circuit 144 is also configured to generate a tail pointer exists indicator 150 (e.g., a bit with logic '0' is invalid/does not exist, and logic '1' as valid/exists) to indicate if a content-addressable entry 102(0)-102(N) exists or not that is a tail entry in an established linked list for the input resource ID 110. The tail pointer exists indicator 150 along with the global output tail entry word 149 constitutes the global output tail entry indicator 142 in this example.

With continuing reference to FIG. 1, the memory system 100 includes a feedback mechanism that couples the global output tail entry indicator 142 back to each of the content-addressable entries 102(0)-102(N). The global output tail entry indicator 142 may also include the input resource ID 110 of the incoming input resource establishment indicator 108. In this manner, each content-addressable entry 102(0)-102(N) is capable of establishing itself as a new content-addressable entry 102(0)-102(N) for the input resource establishment indicator 108. And if a linked list for the input resource ID 110 is already established in the content-addressable entries 102(0)-102(N) according to the tail pointer exists indicator 150, then the new content-addressable entry 102(0)-102(N) allocated to store the input resource establishment indicator 108 receives information on the entry ID of the content-addressable entry 102(0)-102(N) that is the tail entry for the linked list for the input resource ID 110. For example, the memory system 100 may be configured to store or access a free list of available content-addressable entries 102(0)-102(N) that are not part of an existing linked list and available to be used to establish an entry for a linked list for a given input resource ID 110. In this manner, the new content-addressable entry 102(0)-102(N) can not only store the input resource ID 110 in its respective entry tracking register 116(0)-116(N), but also store the entry ID of the content-addressable entry 102(0)-102(N) that is the tail entry for the linked list for the input resource ID 110 in its respective dependency ID register 136(0)-136(N) and update its dependency ID valid indicator 138(0)-138(N). If the new allocated content-addressable entry 102(0)-102(N) is the first entry in a new linked list, the dependency ID valid indicator 138(0)-138(N) and its respective dependency ID register 136(0)-136(N) are updated as invalid as being a single entry linked list at that point. However, if the new allocated content-addressable entry 102(0)-102(N) is the tail entry for an existing linked list present in the memory system 100, the dependency ID valid indicator 138(0)-138(N) of its respective dependency ID register 136(0)-136(N) is updated as identifying the content-addressable entries 102(0)-102(N) that was the previous tail entry for the linked list.

With continuing reference to FIG. 1, to establish a new content-addressable entry 102(0)-102(N) in the memory system 100 for the incoming input resource establishment indicator 108, each content-addressable entry 102(0)-102(N) is configured to receive the global output tail entry indicator 142. The global output tail entry indicator 142 indicates the new content-addressable entry 102(0)-102(N) to be established as well as the entry ID of the content-addressable entry 102(0)-102(N) that is the tail entry, if any, for a linked list associated with the input resource ID 110. The content-addressable entry 102(0)-102(N) that identifies itself as the new content-addressable entry based on the received global output tail entry indicator 142 associates and stores the input resource ID 110 in its respective resource ID register 118(0)-118(N). The new content-addressable entry 102(0)-102(N) that identifies itself as the new content-addressable entry also updates and sets its tail pointer indicator 128(0)-128(N) as being the new tail entry for a linked list for the input resource ID 110 stored in its resource ID register 118(0)-118(N). If the tail pointer exists indicator 150 indicates that a tail entry does exist for the input resource ID 110, the new content-addressable entry 102(0)-102(N) also associates and updates its dependency ID register 136(0)-136(N) to store the dependency ID 137(0)-137(N) of the entry ID of the current tail entry in the linked list for the input resource ID 110, and updates its dependency ID valid register 138(0)-138(N) as valid. However, on the other hand, if the tail pointer exists indicator 150 indicates that no tail entry exists for the input resource ID 110, then the new content-addressable entry 102(0)-102(N) is also configured to update and set its head pointer indicator 134(0)-134(N) as being the head entry for a linked list (e.g. a logic '1' state) for the input resource ID 110, meaning that the linked list for the input resource ID 110 is a one (1) entry linked list so far, and thus, the new content-addressable entry 102(0)-102(N) cannot be dependent on another content-addressable entry 102(0)-102(N). If a content-addressable entry 102(0)-102(N) is not a head entry in a linked list, its head pointer indicator 134(0)-134(N) is set to not be a head entry (e.g., a logic '0' state). Thus, in an example, the head pointer indicators 134(0)-134(N) can be registers that are a single bit in size. Thus, if it is desired to scale (e.g., increase) the number of content-addressable entries 102(0)-102(N), a low overhead head pointer indicator 134(0)-134(N) of a single bit can be replicated in the scaled content-addressable entries 102(0)-102(N).

The content-addressable entries 102(0)-102(N) are also able to identify themselves as a tail entry for the input resource ID 110 based on their tail pointer indicator 128(0)-128(N) and the resource ID 124(0)-124(N) stored in its respective resource ID register 118(0)-118(N). If this situation is present, this means there was an existing linked list established among at least one (1) other content-addressable entry 102(0)-102(N) in the memory system 100 for the input resource ID 110. In this instance, the content-addressable entry 102(0)-102(N) that identified itself as the tail entry in a linked list for the input resource ID 110 updates its tail pointer indicator 128(0)-128(N) to disassociate and unset itself with the tail entry, indicating it is no longer the tail entry in the linked list for the input resource ID 110. Its dependency ID 137(0)-137(N) stored in its dependency ID register 136(0)-136(N), if present, is still valid. Thus, in an example, the dependency ID registers 136(0)-136(N) only need to be sized to be able to uniquely identify a content-addressable entry 102(0)-102(N) by an entry ID, which would be $\log_2 \text{'N+1'}$. Thus, if it is desired to scale (e.g., increase) the number of content-addressable entries 102(0)-102(N), low overhead dependency ID registers 136(0)-136(N) can be replicated in each of the content-addressable entries 102(0)-102(N).

In this manner, the memory system 100 is configured to generate multiple linked lists through establishment of its content-addressable entries 102(0)-102(N) to each be associated with a resource ID based on incoming input resource establishment indicators 108 from the transactions 106 in the staged circuit 105. Content-addressable entries 102(0)-102(N) that are associated with a common input resource ID 110 are part of the same linked list. Content-addressable entries 102(0)-102(N) that are associated with a different input resource ID 110 are part of the different linked lists existing within the same memory system 110.

For example, FIGS. 2B-2D are tables 200B, 200C, 200D illustrating exemplary states of the content-addressable entries 102(0)-102(N) in the memory system 100 in FIG. 1 after a linked list is established for the input resource ID 110 in a received input resource establishment indicator 108 identifying resource address 'A' and the establishment of subsequent content-addressable entries 102(0)-102(N) in the linked list for the input resource ID 110 identifying resource address 'A'. In this regard, as shown in table 200B in FIG. 2B, a first content-addressable entry 102(0) is established for the input resource ID 110 identifying resource address 'A'. As shown, both its head pointer indicator 134(0)-134(N) and tail pointer indicator 128(0)-128(N) are both set (e.g., to '1' logic state—1'b1) to indicate that the content-addressable entry 102(0) is both the head pointer and tail pointer of a linked list for resource address 'A'. However, as shown in FIG. 2B, the dependency ID valid register 138(0) is set to invalid (e.g., '0' logic state—1'b0) to indicate that the first content-addressable entry 102(0) is not dependent on any other content-addressable entry 102(1)-102(N) as being part of a single-entry linked list as this time.

The table 200C in FIG. 2C illustrates the states of the content-addressable entries 102(0)-102(N) in the memory system 100 in FIG. 1 after a second input resource establishment indicator 108 is received that also has an input resource ID 110 identifying resource address 'A'. In this example, the memory system 100 establishes a second content-addressable entry 102(1) for the input resource ID 110 identifying resource address 'A' as the new tail entry as indicated by its tail pointer indicator 128(1) set to indicate it is a tail entry (e.g., to '1' logic state—1'b1) for the linked list for resource address 'A'. Also, as shown in FIG. 2C, the dependency ID valid register 138(1) is set to valid (e.g., '1' logic state—1'b1) to indicate that the second content-addressable entry 102(1) is dependent on the first content-addressable entry 102(0) as part of the linked list for resource address 'A'. The dependency ID 137(1) in the dependency ID register 138(1) is set to point to the first content-addressable entry 102(0) (labeled 'h0 in FIG. 2C) to indicate its dependency on the first content-addressable entry 102(0) as part of the linked list for resource address 'A'. The first content-addressable entry 102(0) is updated to unset the tail pointer indicator 128(0) (1'b0) to indicate that the first content-addressable entry 102(0) is no longer the tail entry for the linked list for resource address 'A'. Note that the head pointer indicator 134(1) for the second content-addressable entry 102(1) is not updated to be the head entry since the first content-addressable entry 102(0) is the head entry for the linked list for resource address 'A'.

The table 200D in FIG. 2D illustrates the states of the content-addressable entries 102(0)-102(N) in the memory system 100 in FIG. 1 after a third input resource establishment indicator 108 is received that again has an input resource ID 110 identifying resource address 'A'. In this example, the memory system 100 establishes a third content-addressable entry 102(2) for the input resource ID 110 identifying resource address 'A' as the new tail entry as indicated by its tail pointer indicator 128(2) set to indicate it is a tail entry (e.g., to '1' logic state—1'b1) for the linked list for resource address 'A'. Also, as shown in FIG. 2D, the dependency ID valid register 138(2) is set to valid (e.g., '1' logic state—1'b1) to indicate that the third content-addressable entry 102(1) is dependent on the second content-addressable entry 102(1) as part of the linked list for resource address 'A'. The dependency ID 137(2) in the dependency ID register 138(2) is set to point to the second content-addressable entry 102(1) (labeled 'h1 in FIG. 2D) to indicate its dependency on the second content-addressable entry 102(1) as part of the linked list for resource address 'A'. The second content-addressable entry 102(1) is updated to unset the tail pointer indicator 128(1) (1'b0) to indicate that the second content-addressable entry 102(1) is no longer the tail entry for the linked list for resource address 'A'. Note that the head pointer indicator 134(2) for the third content-addressable entry 102(2) is not updated to be the head entry since the first content-addressable entry 102(0) is still the head entry for the linked list for resource address 'A'.

Thus, in this manner, the memory system 100 in FIG. 1 is configured to automatically establish and add new content-addressable entries 102(0)-102(N) associated with a given resource ID to a linked list of content-addressable entries 102(0)-102(N) associated with the same resource ID for ordering and tracking multiple instances of access to a resource. The establishment of the linked lists for given resources can be used to support a first-in, first-out (FIFO) structure for instances of access to resources. Multiple linked lists each with their own associated resource ID can be established and maintained in the memory system 100 though linking of specific content-addressable entries 102(0)-102(N) in the memory system 100. As an example, the memory system 100 can be coupled to a pipeline or other bus in which in-flight instances of access to resources that are propagated on the pipeline or bus as transactions 106 are automatically received as the received input resource establishment indicators 108 in the memory system 100 to be searched across the content-addressable entries 102(0)-102(N) in the memory system 100 to identify if a linked list exists for a respective input resource ID 110. In response, content-addressable entries 102(0)-102(N) are automatically established in linked lists associated with a resource ID in the memory system 100 for ordering and tracking.

FIG. 3 is a flowchart illustrating an exemplary process 300 of establishing a new instance of access to a resource in a content-addressable entry 102(0)-102(N) in the memory system 100 in FIG. 1, based on an input resource establishment indicator 108 indicating a new instance of access to the resource. In this exemplary process 300, the input resource ID 110 of an incoming input resource establishment indicator 108 matches an existing, already established content-addressable entry 102(0)-102(N) in the memory system 100, meaning a linked list has already been established for a resource of the input resource ID 110. Thus, a new content-addressable entry 102(0)-102(N) is established for the new incoming input resource establishment indicator 108, and the new content-addressable entry 102(0)-102(N) and the current content-addressable entry 102(0)-102(N) identified as the tail entry of the linked list for the input resource ID 110 are updated, as described above and also as described below in the process 300.

As shown in FIG. 3, for each content-addressable entry 102(0)-102(N)) of a plurality of content-addressable entries 102(0)-102(N) (block 302 in FIG. 3), the process 300 includes searching an input resource ID 110 in an input resource establishment indicator 108 on a resource establishment input 114 against a resource ID 124(0)-124(N) of the content-addressable entry 102(0)-102(N) (block 304 in FIG. 3). Also, for each content-addressable entry 102(0)-102(N) of the plurality of content-addressable entries 102(0)-102(N) (block 302 in FIG. 3), the process 300 includes the content-addressable entry 102(0)-102(N) generating an output tail entry indicator 132(0)-132(N) indicating an entry ID of the content-addressable entry 102(0)-102(N), in response to the resource ID 124(0)-124(N) of the content-addressable entry 102(0)-102(N) matching the input resource ID 110 and the content-addressable entry 102(0)-102(N) being a tail entry in a linked list associated with the input resource ID 110 (block 306 in FIG. 3).

The process 300 also includes the memory system 100 generating a global output tail entry indicator 142 on a tail entry indicator output 143 coupled to each of the plurality of content-addressable entries 102(0)-102(N) indicating a valid tail entry ID of a first content-addressable entry 102(0)-102(N) of the plurality of content-addressable entries 102(0)-102(N) whose resource ID 124(0)-124(N) matched the input resource ID 110 and being the tail entry in the linked list associated with the input resource ID 110 (block 308 in FIG. 3). The process 300 also includes the memory system 100 allocating a new content-addressable entry 102(0)-102(N) for the input resource ID 110 in a free content-addressable entry 102(0)-102(N) among the plurality of content-addressable entries 102(0)-102(N) (block 310 in FIG. 3).

The process 300 also includes, for the new content-addressable entry 102(0)-102(N), in response to the global output tail entry indicator 142 indicating the valid tail entry ID of the first content-addressable entry 102(0)-102(N) (block 312 in FIG. 3), associating the new content-addressable entry 102(0)-102(N) with the input resource ID 110 (block 314 in FIG. 3). The process 300 also includes, for the new content-addressable entry 102(0)-102(N), in response to the global output tail entry indicator 142 indicating the valid tail entry ID of the first content-addressable entry 102(0)-102(N) (block 312 in FIG. 3), associating the new content-addressable entry 102(0)-102(N) as the tail entry in the linked list associated with the input resource ID 110 (block 316 in FIG. 3). The process 300 also includes, for the new content-addressable entry 102(0)-102(N), in response to the global output tail entry indicator 142 indicating the valid tail entry ID of the first content-addressable entry 102(0)-102(N) (block 312 in FIG. 3), associating the new content-addressable entry 102(0)-102(N) to be dependent on the first content-addressable entry 102(0)-102(N) (block 318 in FIG. 3).

The process 300 also includes the first content-addressable entry 102(0)-102(N), in response to the content-addressable entry 102(0)-102(N) being indicated as the first content-addressable entry 102(0)-102(N) in the global output tail entry indicator 142 (block 320 in FIG. 3), disassociating the first content-addressable entry 102(0)-102(N) as being the tail entry in the linked list associated with the input resource ID 110 (block 322 in FIG. 3).

With reference back to FIG. 1, the memory system 100 is also configured to retire content-addressable entries 102(0)-102(N) established in a linked list associated with a resource in response to an indication that an instance of access to a resource has been completed. For example, a linked list of content-addressable entries 102(0)-102(N) associated with a resource in the memory system 100 can be established to track and order instances of access to the resource, but when an instance of access to a resource has been completed, the linked list of content-addressable entries 102(0)-102(N) associated with the resource should be retired. Retiring a content-addressable entry 102(0)-102(N) means the entry is freed from its associated linked list and then the remaining content-addressable entries 102(0)-102(N) in the linked list associated with the resource, if any, are repaired to maintain the uncompleted tracked entries and their order.

In this regard, as shown in FIG. 1, the memory system 100 also includes a retirement indicator input 152 that is coupled to each content-addressable entry 102(0)-102(N). The retirement indicator input 152 is configured to carry an input retirement ID 154 identifying either a resource ID or content-addressable entry 102(0)-102(N) to be retired in the memory system. The input retirement ID 154 can be provided and broadcasted independently of any incoming input resource establishment indicators 108 with the architecture of the content-addressable entries 102(0)-102(N). Since the linked lists in the memory system 100 are created and maintained based on the head entry being the earliest ordered entry, the retirement related to a resource ID to be retired is the head entry in the linked list associated with the resource ID. In this regard, in this example, when the content-addressable entries 102(0)-102(N) receive the retirement indicator input 152, the content-addressable entries 102(0)-102(N) include a retire circuit 156(0)-156(N) that is configured to determine if its content-addressable entry 102(0)-102(N) is to be retired. As one example, this can mean that its resource ID 124(0) matches the input retirement ID 154 and such content-addressable entry 102(0)-102(N) is the head entry as indicated by its head pointer indicator 134(0)-134(N). Alternatively, the input retirement ID 154 may just identify a particular content-addressable entry 102(0)-102(N) to be retired instead of a resource ID. If either case, for such a retirement indication, this means that such content-addressable entry 102(0)-102(N) identified to be retired as a head entry in a linked list identified by the input retirement ID 154 is to be retired. In this example, if a retire circuit 156(1)-156(N) of a content-addressable entry 102(0)-102(N) determines it is to be retired, then the content-addressable entry 102(0)-102(N) updates the head pointer indicator 134(0)-134(N) as no longer being the head entry and an entry valid indicator 158(0)-158(N) as the entry not being valid (e.g., a logic '0' state). In response, the retire circuit 156(0)-156(N) provides an entry indicator 160(0)-160(N) indicating its invalid entry to a dependency retirement circuit 162. The dependency retirement circuit 162 is configured to communicate the entry indicator 160(0)-160(N) of the content-addressable entry 102(0)-102(N) as individual bits or as a single hot bit word as a retired entry indicator 164 to each of the content-addressable entries 102(0)-102(N). This is so that the dependencies can be updated.

In this regard, each content-addressable entry 102(0)-102(N) receives the retired entry indicator 164 at a dependency compare circuit 166(0)-166(N). The dependency compare circuit 166(0)-166(N) is configured to determine if the retired entry indicator 164 indicates an entry ID that matches a dependency ID 137(0)-137(N) stored in its dependency ID register 136(0)-136(N). If so, this means that such content-addressable entry 102(0)-102(N) is dependent on the content-addressable entry 102(0)-102(N) that was retired, and in this case, this means that such content-addressable entry 102(0)-102(N) was dependent on the content-addressable entry 102(0)-102(N) that was the head entry in the linked list associated with its resource ID. In such case, the dependency compare circuit 166(0)-166(N) is configured to update the head pointer indicator 134(0)-134(N) for its content-addressable entry 102(0)-102(N) as the new head entry for its linked list associated with the resource ID 124(0)-124(N) stored in its resource ID register 118(0)-118(N. The dependency compare circuit 166(0)-166(N) is also configured to invalidate its dependency ID valid register 138(0)-138(N) as it is no longer dependent on another content-addressable entry 102(0)-102(N) as a head entry. In this manner, the linked list or content-addressable entry 102(0)-102(N) identified by the input retirement ID 154 is repaired so that what was the second content-addressable entry 102(0)-102(N) in the linked list for the input retirement ID 154 is now the head entry in such linked list. Another content-addressable entry 102(0)-102(N) in the linked list identified by the input retirement ID 154 behind the second content-addressable entry 102(0)-102(N) need not be updated or repaired since their dependencies and status are still the same.

Note that alternatively to the retirement indicator input 152 being a single line configured to carry an encoded input retirement ID 154, the retirement indicator input 152 could be multiple lines each segregated and coupled to a respective content-addressable entry 102(0)-102(N) to carry individual input retirement IDs as single hot bit lines. Also note that the dependency retirement circuit 162 could be configured to output the retired entry indicator 164 as multiple lines each segregated and coupled to a respective content-addressable entry 102(0)-102(N) to carry individual retired entry indicators as single hot bit lines.

FIG. 4 is a table 400 illustrating exemplary states of the content-addressable entries 102(0)-102(N) in the memory system 100 in FIG. 1 when a first instance of access to an input resource ID 110 of address 'A' in a linked list associated with the resource ID of address 'A' is retired from a starting state shown in the table 200D in FIG. 2D. In this regard, as shown in FIG. 4, in this example, the input retirement ID 154 identifies that resource 'A' is to be retired. In response, the content-addressable entry 102(0) is identified by its retire circuit 156(0) as the head entry for the linked list for resource 'A' in the input retirement ID 154. In this regard, the head pointer indicator 134(0) for the first content-addressable entry 102(0) is updated to be unset (e.g., logic state '0'—1'b0) to no longer be the head pointer. Also in response, the second content-addressable entry 102(1) is identified by its retire circuit 156(1) as dependent on the first content-addressable entry 102(0) for the linked list for resource 'A' from the received retired entry indicator 164 indicating that first content-addressable entry 102(0) is retired. In this regard, the dependency compare circuit 166(1) of the second content-addressable entry 102(1) updates the head pointer indicator 134(0) for the second content-addressable entry 102(1) as the head entry (e.g., logic state '1'—1'b1) in the linked list associated with the input retirement ID 154. The dependency compare circuit 166(1) of the second content-addressable entry 102(1) also updates the dependency ID valid register 138(1) of the second content-addressable entry 102(1) as invalid (e.g., logic state '0'—1'b0) to indicate that the second content-addressable entry 102(1) is no longer dependent on the first content-addressable entry 102(0), as would be expected as it is now the head entry in the linked list associated with the input retirement ID 154.

FIG. 5 is a flowchart illustrating an exemplary process 500 of retiring an established instance of access to a resource in a content-addressable entry 102(0)-102(N) in the memory system 100 in FIG. 1. In this exemplary process 500, the input retirement ID 154 to be retired is received, meaning a request to retire a content-addressable entry 102(0)-102(N) that is a head entry in a linked list has already been established for the input retirement ID 154 that is received. Thus, a content-addressable entry 102(0)-102(N) that is the head entry in the linked list for the input retirement ID 154 will be retired, and the next, second content-addressable entry 102(0)-102(N) that is dependent on the head entry in the linked list for the input retirement ID 154 will now become the head entry of the linked list, as described above.

In this regard, as shown in FIG. 5, the process 500 includes an optional searching an input retirement ID 154 on a retirement indicator input 152 against a resource ID 124(0)-124(N) of the content-addressable entry 102(0)-102 (N) (block 502 in FIG. 5). This searching could be performed if the input retirement ID 154 is configured to identify a specific resource ID. As discussed previously, the input retirement ID 154 could also identify a particular content-addressable entry 102(0)-102(N) to retire. The process 500 also includes disassociating the content-addressable entry 102(0)-102(N) as a retired content-addressable entry 102(0)-102(N) as the head entry in the linked list identified by the input retirement ID 154, in response to the retired content-addressable entry being the head entry in the linked list associated with the input retirement ID 154 (block 504 in FIG. 5). The process 500 also includes associating a content-addressable entry 102(0)-102(N) as the head entry in the linked list identified by the input retirement ID 154 in response to the content-addressable entry 102(0)-102(N) being dependent on the retired content-addressable entry 102(0)-102(N) (block 506 in FIG. 5).

FIG. 6 is a schematic diagram of another exemplary memory system 600 that is similar to the memory system 100 in FIG. 1, but that also includes additional components configured to identify a content-addressable entry 102(0)-102(N) that is a head entry in a linked list associated with a searched input resource ID 110. The identification of a content-addressable entry 102(0)-102(N) that is a head entry in a linked list associated with a searched input resource ID 110 can be used to add a new instance of access to a resource identified by an incoming input resource ID 110 of an incoming input resource establishment indicator 108 to the front or head content-addressable entry 102(0)-102(N) of an existing linked list associated with the input resource ID 110. In this manner, the memory system 600 also has the capability of adding a priority entry to an existing linked list for an input resource ID 110 as desired. For example, a new instance of an input resource establishment indicator 108 may be a priority such that it should be placed as the front or head content-addressable entry 102(0)-102(N) of an existing linked list associated with the input resource ID 110. Common elements between the memory system 600 in FIG. 6 and the memory system 100 in FIG. 1 are shown with common element numbers and will not be redescribed. Although not shown in FIG. 6, the retirement mechanisms present and described above in the memory system 100 in FIG. 1 can also be provided in the memory system 600 in FIG. 6.

As shown in FIG. 6, in the content-addressable entries 102(0)-102(N) in this example, the entry comparator circuits 122(0)-122(N) are also each coupled to a respective head entry indicator circuit 630(0)-630(N). The head entry indicator circuits 630(0)-630(N) are also each coupled to the respective head pointer indicator 134(0)-134(N) indicating if its content-addressable entry 102(0)-102(N) is a head entry in a linked list as well as a super head input 631 coupled to each of the head entry indicator circuits 630(0)-630(N). The head entry indicator circuits 630(0)-630(N) are configured to indicate if its respective content-addressable entry 102(0)-102(N) is the head entry for a linked list for the input resource ID 110 that matched the resource ID 124(0)-124(N) stored in its resource ID register 118(0)-118(N) based on the status of its head pointer indicator 134(0)-134(N) and if the super head input 631 is active (e.g., a logic '1' value). In this instance, the head entry indicator circuits 630(0)-630(N) are each configured to generate a respective output head entry indicator 632(0)-632(N) indicating if its respective content-addressable entry 102(0)-102(N) is the head entry in a linked list associated with the input resource ID 110 of the input resource establishment indicator 108. For example, if a content-addressable entry 102(0)-102(N) is not the head entry in a linked list associated with the input resource ID 110 of the input resource establishment indicator 108, a NULL value could be returned on its respective output head entry indicator 632(0)-632(N). However, if a content-addressable entry 102(0)-102(N) is the head entry in a linked list associated with the input resource ID 110 of the input resource establishment indicator 108, a hot bit identifying the entry ID (e.g., 0, 1, . . . N) of the matching content-addressable entry 102(0)-102(N) is returned on its respective output head entry indicator 632(0)-632(N). In other words, in this example, since the entries are content-addressable entries 102(0)-102(N), the output head entry indicators 632(0)-632(N) are hot bit indicators wherein only one of the output head entry indicators 632(0)-632(N) should be active or hot to signify the unique entry that is a head entry of an existing linked list for the input resource ID 110, if such linked list has been established already. If not, none of the output head entry indicators 632(0)-632(N) will be active (i.e., hot).

As also shown in FIG. 6, the memory system 600 includes a dependency status aggregator circuit 640 similar to the dependency status aggregator circuit 140 in FIG. 1. However, the dependency status aggregator circuit 640 is also coupled to each of the output head entry indicators 632(0)-632(N) generated by the respective content-addressable entries 102(0)-102(N). The dependency status aggregator circuit 640 is configured to generate the global output tail entry indicator 142 on a tail entry indicator output 143 indicating which entry 0-N of the content-addressable entries 102(0)-102(N) is the last entry in a linked list associated with the input resource ID 110 for the incoming input resource establishment indicator 108 to be established. The dependency status aggregator circuit 640 in this example is also configured to generate a global output head entry indicator 642 on a head entry indicator output 643 indicating which entry 0-N of the content-addressable entries 102(0)-102(N) is the head entry in a linked list associated with the input resource ID 110 for the incoming input resource establishment indicator 108 to be established. In this regard, in this example, the dependency status aggregator circuit 640 also includes a head entry indicator circuit 644, which is an OR-based logic circuit in this example. The head entry indicator circuit 644 is configured to aggregate each of the output head entry indicators 632 (0)-632(N) into a combined output head entry indicator 646 that can then be encoded into a global output head entry word 649 as an encoded word by an encoder circuit 648. In this manner, in this example, the global output head entry indicator 642 is an encoded word that identifies which content-addressable entry 102(0)-102(N), if any, is the head entry in an established linked list for the input resource ID 110. The head entry indicator circuit 644 is also configured to generate a head pointer exists indicator 650 (e.g., a bit with logic '0' is invalid/does not exist, and logic '1' as valid/exists) to indicate if a content-addressable entry 102(0)-102(N) exists or not that is a head entry in an established linked list for the input resource ID 110. The head pointer exists indicator 650 along with the global output head entry word 649 constitutes the global output head entry indicator 642 in this example.

With continuing reference to FIG. 6, the memory system 600 includes a feedback mechanism that couples the global output head entry indicator 642 back to each of the content-addressable entries 102(0)-102(N). The global output head entry indicator 642 may also include the input resource ID 110 of the incoming input resource establishment indicator 108. When the global output head entry indicator 642 has a head pointer exists indicator 650 that indicates a head entry exists for the linked list associated with the input resource ID 110, the memory system 600 indicates the new, head content-addressable entry 102(0)-102(N) to be established as well as the entry ID of the content-addressable entry 102(0)-102(N) that is the head entry, if any, for the linked list associated with the input resource ID 110. The content-addressable entry 102(0)-102(N) that identifies itself as the new, head content-addressable entry based on the received global output head entry indicator 642 associates and stores the input resource ID 110 in its resource ID register 118(0)-118(N). The new, head content-addressable entry 102(0)-102(N) that identifies itself as the new, head content-addressable entry also updates and sets its head pointer indicator 134(0)-134(N) as being the new head entry for the linked list for the input resource ID 110 stored in its resource ID register 118(0)-118(N) and sets its dependency ID valid indicator 138(0)-138(N) to invalid as not being dependent on another content-addressable entry 102(0)-102(N) as being a head entry. However, on the other hand, if the head pointer exists indicator 650 indicates that no head entry exists for the input resource ID 110, then the new, head content-addressable entry 102(0)-102(N) is also configured to update and set its tail pointer indicator 128(0)-128(N) as being the tail entry for the linked list for the input resource ID 110, meaning that the linked list for the input resource ID 110 is a one (1) entry linked list so far, and thus, the new, head content-addressable entry 102(0)-102(N) cannot be dependent on another content-addressable entry 102(0)-102(N).

The content-addressable entries 102(0)-102(N) are also able to identify themselves as a head entry for the input resource ID 110 based on their respective head pointer indicator 134(0)-134(N) and the resource ID 124(0)-124(N) stored in its respective resource ID register 118(0)-118(N). If this situation is present, this means there was an existing linked list established among at least one (1) other content-addressable entry 102(0)-102(N) in the memory system 600 for the input resource ID 110 as a head entry. In this instance, the content-addressable entry 102(0)-102(N) that identified itself as the head entry in the linked list for the input resource ID 110 updates its head pointer indicator 134(0)-134(N) to disassociate and unset itself with the head entry, indicating it is no longer the head entry in the linked list for the input resource ID 110. The dependency ID of the new, head content-addressable entry 102(0)-102(N) is stored in its dependency ID register 136(0)-136(N) so that it depends from the new head content-addressable entry 102(0)-102(N), and its dependency ID valid indicator 138(0)-138(N) is set to a valid state.

In the memory systems 100, 600 in FIGS. 1 and 6, note that if there is latency in the feedback mechanism of the content-addressable entries 102(0)-102(N) being updated based on the global output tail entry indicator 142 and/or the global output head entry indicator 642, the content-addressable entries 102(0)-102(N) may not have the correct settings for a new incoming input resource establishment indicator 108. This can be especially true if the number of new content-addressable entries 102(0)-102(N) is large adding additional capacitance load on the tail entry indicator output 143 and/or the head entry indicator output 643 and slowing signal propagation of the global output tail entry indicator 142 and/or the global output head entry indicator 642.

In this regard, FIG. 7 is a schematic diagram of another exemplary memory system 700 that can be similar to the memory systems 100, 600 in FIGS. 1 and 6. However, the memory system 700 in FIG. 7 includes a stage tracking circuit 768 configured to track updates to be made to content-addressable entries 102(0)-102(N) in response to a new input resource establishment indicator 108 to be allocated as a new content-addressable entry 102(0)-102(N), to still allow updated searching in the event of latency in updating the content-addressable entries 102(0)-102(N). In this manner, the updating of the content-addressable entries 102(0)-102(N) does not have to be done in one cycle of the staged circuit 105. Common elements between the memory systems 100, 600 in FIGS. 1 and 6 and the memory system 700 in FIG. 7 are shown with common element numbers. The memory system 700 in FIG. 7 can also include the retirement mechanism in the memory system 100 in FIG. 1.

In this regard, as shown in FIG. 7, the stage tracking circuit 768 is coupled to the tail entry indicator output 143 to receive the global output tail entry indicator 142. This allows the stage tracking circuit 768 to receive and be aware of all the information that is used to update the content-addressable entries 102(0)-102(N) as previously discussed in regard to the memory system 100 in FIG. 1. The stage tracking circuit 768 can buffer and make available the information in the global output tail entry indicator 142 to the dependency status aggregator circuit 140. In this manner, when the dependency status aggregator circuit 140 is determining the entry ID of the content-addressable entry 102(0)-102(N) that is the tail entry in a linked list associated with the input resource ID 110, the dependency status aggregator circuit 140 can make this determination based on the most up to date information for updating the content-addressable entries 102(0)-102(N) as part of the global output tail entry indicator 142. The global output tail entry indicator 142 is still provided as a feedback mechanism to the content-addressable entries 102(0)-102(N) for them to be updated as appropriate, but in case this updating is not completed before the next input resource establishment indicator 108 is received, the dependency status aggregator circuit 140 can still make an accurate determination of the entry ID of the content-addressable entries 102(0)-102(N) that is the tail entry in a linked list associated with the input resource ID 110.

FIG. 8 is a schematic diagram of an exemplary processor-based system 800 that includes a processor 802 with an instruction pipeline IP that has in-flight instructions 804 as instances of access to a resource as a memory address. The instruction pipeline IP can be coupled to a memory system 806, including, but not limited to, the memory systems 100, 600, 700 in FIGS. 1, 6, and/or 7, to automatically receive such instructions 804 as instances of access to a resource as a memory address for establishing content-addressable entries in a linked list in the memory system 806 associated with the memory address as a resource to order and track such instructions 804. In this manner, the memory system 806 can be used to track and order instructions 804 that are accessing the same memory address to manage hazards.

In this regard, the processor 802 may be an in-order or an out-of-order processor (OoP) as non-limiting examples. The processor 802 includes an instruction processing circuit 808 that includes an instruction fetch circuit 810 configured to fetch instructions 804 from an instruction memory 812. The instruction memory 812 may be provided in or as part of a system memory in the processor-based system 800 as an example. The instruction fetch circuit 810 in this example is configured to provide the instructions 804 as fetched instructions 804F into the instruction pipeline IP as an instruction stream in the instruction processing circuit 808 to be decoded in a decode circuit 814 and processed as decoded instructions 804D before being executed in an execution circuit 816. The produced value generated by the execution circuit 816 from executing the decoded instruction 804D is committed (i.e., written back) to a storage location indicated by the destination of the decoded instruction 804D. This storage location could be memory 818 in the processor-based system 800 or a physical register $P_0$-$P_X$ in a physical register file (PRF) 820, as examples.

With continuing reference to FIG. 8, once fetched instructions 804F are decoded into decoded instructions 804D, the decoded instructions 804D are provided to a rename/allocate circuit 822 in the instruction processing circuit 808. The rename/allocate circuit 822 is configured to determine if any register names in the decoded instructions 840D need to be renamed to break any register dependencies that would prevent parallel or out-of-order processing. The rename/allocate circuit 822 is also configured to call upon a register map table (RMT) 824 to rename a logical source register operand and/or write a destination register operand of a decoded instruction 804D to available physical registers $P_0$-$P_X$ in the PRF 820. The RMT 824 contains a plurality of mapping entries each mapped to (i.e., associated with) a respective logical register $R_0$-$R_P$. The mapping entries are configured to store information in the form of an address pointer to point to a physical register $P_0$-$P_X$ in the PRF 820. Each physical register $P_0$-$P_X$ in the PRF 820 contains a data entry 826(0)-826(X) configured to store data for the source and/or destination register operand of a decoded instruction 804D.

The decoded instructions 804D that are processed by the rename/allocate circuit 822 are then communicated to a scheduling circuit 828 to be scheduled for execution by the execution circuit 816. The instructions 804D are then committed as committed instructions 804E with the produced results stored to memory 818, if applicable.

FIG. 9 is a block diagram of an exemplary processor-based system 900 that includes a processor 902 that can also include a memory system 904 including, but not limited to, the memory systems 100, 600, 700 in FIGS. 1, 6, and/or 7, to automatically receive such instructions 804 as instances of access to a resource as a memory address for establishing content-addressable entries in a linked list in the memory system 806 associated with the memory address as a resource to order and track such instructions 804. In this manner, the memory system 806 can be used to track and order instructions 804 that are accessing the same memory address to manage hazards. The memory system 806 could also be used to manage cache commands for a cache system.

The processor-based system 900 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based system 900 includes the processor 902. The processor 902 represents one or more general-purpose processing circuits, such as a microprocessor, central processing unit, or the like. The processor 902 is configured to execute processing logic in computer instructions for performing the operations and steps discussed herein. In this example, the processor 902 includes a memory system 904.

The processor 902 also includes an instruction cache 906 for temporary, fast access memory storage of instructions and an instruction processing circuit 908. Fetched or prefetched instructions from a memory, such as from a system memory 910 over a system bus 912, are stored in the instruction cache 906. The instruction processing circuit 908 is configured to process instructions fetched into the instruction cache 906 and process the instructions for execution. The instruction processing circuit 908 is configured to insert the fetched instructions into one or more instruction pipelines that are then processed to execution.

The processor 902 and the system memory 910 are coupled to the system bus 912 and can intercouple peripheral devices included in the processor-based system 900. As is well known, the processor 902 communicates with these other devices by exchanging address, control, and data information over the system bus 912. For example, the processor 902 can communicate bus transaction requests to a memory controller 914 in the system memory 910 as an example of a slave device. Although not illustrated in FIG. 9, multiple system buses 912 could be provided, wherein each system bus constitutes a different fabric. In this example, the memory controller 914 is configured to provide memory access requests to a memory array 916 in the system memory 910. The memory array 916 is comprised of an array of storage bit cells for storing data. The system memory 910 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 912. As illustrated in FIG. 9, these devices can include the system memory 910, one or more input device(s) 918, one or more output device(s) 920, a modem 922, and one or more display controllers 924, as examples. The input device(s) 918 can include any type of input device, including, but not limited to, input keys, switches, voice processors, etc. The output device(s) 920 can include any type of output device, including, but not limited to, audio, video, other visual indicators, etc. The modem 922 can be any device configured to allow exchange of data to and from a network 926. The network 926 can be any type of network, including, but not limited to, a wired or wireless network, a private or public network, a local area network (LAN), a wireless local area network (WLAN), a wide area network (WAN), a BLUETOOTH™ network, and the Internet. The modem 922 can be configured to support any type of communications protocol desired. The processor 902 may also be configured to access the display controller(s) 924 over the system bus 912 to control information sent to one or more displays 928. The display(s) 928 can include any type of display, including, but not limited to, a cathode ray tube (CRT), a liquid crystal display (LCD), a plasma display, etc.

The processor-based system 900 in FIG. 9 may include a set of instructions 930 that may be used to provide the functionality and/or access to the memory system 904. The instructions 930 may be stored in the system memory 910, processor 902, and/or instruction cache 906 as examples of non-transitory computer-readable medium 932. The instructions 930 may also reside, completely or at least partially, within the system memory 910 and/or within the processor 902 during their execution. The instructions 930 may further be transmitted or received over the network 926 via the modem 922, such that the network 926 includes the non-transitory computer-readable medium 932. The instructions 930 may also include instructions that when executed by the processor 902, cause the memory system 904 to establish and/or retire content-addressable entries for linked lists associated with a resource ID.

While the non-transitory computer-readable medium 932 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory (RAM), a magnetic disk storage medium, an optical storage medium, flash memory devices, etc.) and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories, registers, or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium, and executed by a processor or other processing device, or combinations of both. The components of the processors and systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be referenced throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A system for tracking in-flight instances of access to a resource, the system comprising:
  one or more processing units; and
  a computer-readable storage medium having encoded thereon computer-executable instructions to cause the one or more processing units to:
    for each content-addressable entry of the plurality of content-addressable entries;
      search an input resource identifier (ID) associated with a resource in an input resource establishment indicator on a resource establishment input against a resource ID of the content-addressable entry;
      generate an output tail entry indicator indicating an entry ID of the content-addressable entry in response to the resource ID of the content-addressable entry matching the input resource ID and the content-addressable entry being a tail entry in a linked list associated with the input resource ID;
      generate a global output tail entry indicator on a tail entry indicator output coupled to each of the plurality of content-addressable entries indicating a valid tail entry ID of a first content-addressable entry of the plurality of content-addressable entries whose resource ID matched the input resource ID and being the tail entry in the linked list associated with the input resource ID; and
      allocate a new content-addressable entry for the input resource ID in a free content-addressable entry among the plurality of content-addressable entries;
    in response to the global output tail entry indicator indicating the valid tail entry ID of the first content-addressable entry:
      associate the new content-addressable entry with the input resource ID;
      associate the new content-addressable entry as the tail entry in the linked list associated with the input resource ID; and
      associate the new content-addressable entry to be dependent on the first content-addressable entry; and
    in response to the content-addressable entry being indicated as the first content-addressable entry in the global output tail entry indicator:
      disassociate the first content-addressable entry as being the tail entry in the linked list associated with the input resource ID.

2. The system of claim 1, wherein the instructions further cause the one or more processing units to: in response to the global output tail entry indicator indicating the valid tail entry ID of the first content-addressable entry:
  set the new content-addressable entry to have a valid dependency on the first content addressable entry.

3. The system of claim 1, wherein the instructions further cause the one or more processing units to:

generate the output tail entry indicator indicating an invalid entry ID of the content-addressable entry in response to the resource ID of the content-addressable entry not matching the input resource ID;
  generate the global output tail entry indicator on the tail entry indicator output indicating no valid tail entry ID in response to each of the plurality of content-addressable entries generating the output tail entry indicator indicating the invalid entry ID; and
  in response to the global output tail entry indicator indicating no valid tail entry ID:
  associate the new content-addressable entry with the input resource ID;
  associate the new content-addressable entry as the tail entry of the linked list associated with the input resource ID; and
  associate the new content-addressable entry as a head entry associated with the input resource ID.

4. The system of claim 3, wherein the instructions further cause the one or more processing units to:-in response to the global output tail entry indicator indicating no valid tail entry ID:
  set the new content-addressable entry to have an invalid dependency on a content-addressable entry of the plurality of content-addressable entries.

5. The system of claim 3, wherein the instructions further cause the one or more processing units to:
  disassociate the content-addressable entry as a retired content-addressable entry as the head entry in the linked list identified by the input retirement ID, in response to the retired content-addressable entry being the head entry in the linked list identified by the input retirement ID; and
  associate the content-addressable entry as the head entry in the linked list identified by the input retirement ID in response to the content-addressable entry being dependent on the retired content-addressable entry.

6. The system of claim 5, wherein the instructions further cause the one or more processing units to: set the content-addressable entry identified on the input retirement ID, to have an invalid dependency.

7. The system of claim 5, wherein the instructions further cause the one or more processing units to:
  disassociate the content-addressable entry as a retired content-addressable entry as the head entry in the linked list identified by the input retirement ID by being configured to unset the head pointer indicator in the retired content-addressable entry, in response to the retired content-addressable entry having its head entry set as the head entry in the linked list associated with the input retirement ID; and
  associate the content-addressable entry as the head entry in the linked list associated with the input retirement ID by being configured to set the head pointer indicator in the content-addressable entry, in response to the dependency identifier register having a dependency ID matching the retired content-addressable entry.

8. The system of claim 1, wherein the instructions further cause the one or more processing units to create a plurality of linked lists among the plurality of content-addressable entries, each linked list of the plurality of linked lists associated with a unique input resource ID of the plurality of input resource IDs.

9. The system of claim 1, wherein the instructions further cause the one or more processing units to:
  generate the output tail entry indicator indicating the entry ID of the content-addressable entry based on the resource ID of the content-addressable entry matching the input resource ID and the content-addressable entry being the tail entry in the linked list associated with the input resource ID.

10. The system of claim 1, wherein the instructions further cause the one or more processing units to:

receive the output tail entry indicators from each of the plurality of content-addressable entries; and generate the global output tail entry indicator on the tail entry indicator output indicating the valid tail entry ID by being further configured to combine each of the output tail entry indicators from each of the plurality of content-addressable entries to generate the global output tail entry indicator.

11. The system of claim 10, wherein the instructions further cause the one or more processing units to: encode the combined output tail entry indicators from each of the plurality of content-addressable entries into the global output tail entry indicator indicating the valid tail entry ID of the first content-addressable entry.

12. The system of claim 1, wherein the instructions further cause the one or more processing units to:

search the input resource ID of the input resource establishment indicator on the resource establishment input against the resource ID in the resource ID register of the content-addressable entry; and generate the output tail entry indicator indicating the entry ID of the content-addressable entry in response to the resource ID in the resource ID register of the content-addressable entry matching the input resource ID and the tail pointer indicator of the content-addressable entry indicating the content-addressable entry is a tail entry; and each content-addressable entry of the plurality of content-addressable entries configured to, in response to the global output tail entry indicator indicating the valid tail entry ID of the first content-addressable entry:

associate the new content-addressable entry with the input resource ID by being configured to store the input resource ID in the resource ID register of the new content-addressable entry;

associate the new content-addressable entry as the tail entry associated with the input resource ID by being configured to set the tail pointer indicator in the new content-addressable entry indicating the new content-addressable entry is the tail entry associated with the input resource ID in the input resource establishment indicator;

set the new content-addressable entry to be dependent on the first content-addressable entry by being configured to store a dependency ID in the dependency identifier register in the new content-addressable entry identifying the first content-addressable entry; and disassociate the first content-addressable entry from being the tail entry associated with the input resource ID by being configured to unset the tail pointer indicator in the first content-addressable entry as not being the tail entry associated with the input resource ID in the input resource establishment indicator.

13. The system of claim 1, wherein the instructions further cause the one or more processing units to:

generate an output head entry indicator indicating the entry ID of the content-addressable entry in response to the resource ID of the content-addressable entry matching the input resource ID and the content-addressable entry being a head entry in a linked list associated with the input resource ID;

the memory system is further configured to:

generate a global output head entry indicator coupled to each of the plurality of content-addressable entries indicating a valid head entry ID of a second content-addressable entry of the plurality of content-addressable entries whose resource ID matched the input resource ID and the second content-addressable entry being the head entry in the linked list associated with the input resource ID; and allocate a new head content-addressable entry for the input resource ID in a free content-addressable entry among the plurality of content-addressable entries; and each content-addressable entry of the plurality of content-addressable entries is configured to, in response to the output head entry indicator indicating the valid head entry ID of the second content-addressable entry:

associate the new head content-addressable entry with the input resource ID of the input resource establishment indicator;

associate the new head content-addressable entry as the head entry in the linked list associated with the input resource ID; and associate the new head content-addressable entry as not being dependent on any content-addressable entry of the plurality of content-addressable entries; and each content-addressable entry of the plurality of content-addressable entries is configured to, in response to the content-addressable entry being indicated as the second content-addressable entry in the output head entry indicator:

disassociate the second content-addressable entry as being the head entry in the linked list associated with the input resource ID; and associate the second content-addressable entry as being dependent on the new head content-addressable entry.

14. The system of claim 13, wherein the instructions further cause the one or more processing units to: in response to the global output head entry indicator indicating the valid head entry ID of the second content-addressable entry:

set the second content-addressable entry to have a valid dependency on the new head content-addressable entry.

15. The system of claim 13, wherein the instructions further cause the one or more processing units to:

generate the output head entry indicator indicating the entry ID of the content-addressable entry based on the resource ID of the content-addressable entry matching the input resource ID and the content-addressable entry being the head entry in the linked list associated with the input resource ID.

16. The system of claim 13, wherein the instructions further cause the one or more processing units to:

receive the output head entry indicators from each of the plurality of content-addressable entries; and generate the global output head entry indicator indicating the valid head entry ID by being further configured to combine each of the output head entry indicators from each of the plurality of content-addressable entries to generate the global output head entry indicator.

17. The system of claim 1, wherein the instructions further cause the one or more processing units to:

generate the output head entry indicator indicating an invalid head entry ID of the content-addressable entry in response to the resource ID of the content-addressable entry not matching the input resource ID;

the memory system is further configured to:

generate the global output head entry indicator indicating no valid head entry ID in response each of the plurality of content-addressable entries generating the output head entry indicator indicating an invalid entry ID; and each content-addressable entry of the plurality of content-addressable entries is further configured to, in response to the global output head entry indicator indicating no valid head entry ID:

associate the new content-addressable entry with the input resource ID;

associate the new content-addressable entry as the tail entry of the linked list associated with the input resource ID; and associate the new content-addressable entry as the head entry associated with the input resource ID.

18. The system of claim 1, wherein the instructions further cause the one or more processing units to:

generate the global output tail entry indicator based on the tracked first content-addressable entry by the stage tracking circuit whose resource ID matched the input resource ID and being the tail entry in a linked list associated with the input resource ID.

19. The system of claim 1, not comprising a memory access control circuit configured to randomly address the plurality of content-addressable entries based on a memory address.

20. A method of tracking in-flight instances of access to a resource in a memory system, comprising:

for each content-addressable entry of a plurality of content-addressable entries:

searching an input resource identifier (ID) in an input resource establishment indicator on a resource establishment input against a resource ID of the content-addressable entry; and generating an output tail entry indicator indicating an entry ID of the content-addressable entry, in response to the resource ID of the content-addressable entry matching the input resource ID and the content-addressable entry being a tail entry in a linked list associated with the input resource ID;

generating a global output tail entry indicator on a tail entry indicator output coupled to each of the plurality of content-addressable entries indicating a valid tail entry ID of a first content-addressable entry of the plurality of content-addressable entries whose resource ID matched the input resource ID and being the tail entry in the linked list associated with the input resource ID; and allocating a new content-addressable entry for the input resource ID in a free content-addressable entry among the plurality of content-addressable entries;

in response to the global output tail entry indicator indicating the valid tail entry ID of the first content-addressable entry:

associating the new content-addressable entry with the input resource ID;

associating the new content-addressable entry as the tail entry in the linked list associated with the input resource ID; and associating the new content-addressable entry to be dependent on the first content-addressable entry; and in response to the content-addressable entry being indicated as the first content-addressable entry in the global output tail entry indicator:

disassociating the first content-addressable entry as being the tail entry in the linked list associated with the input resource ID.

21. A non-transitory computer-readable medium having stored thereon computer executable instructions which, when executed by a processor, cause the processor to:

for each content-addressable entry of a plurality of content-addressable entries:

search an input resource identifier (ID) associated with a resource in an input resource establishment indicator on a resource establishment input against a resource ID of the content-addressable entry; and generate, by the content-addressable entry, an output tail entry indicator indicating an entry ID of the content-addressable entry, in response to the resource ID of the content-addressable entry matching the input resource ID and the content-addressable entry being a tail entry in a linked list associated with the input resource ID;

generate a global output tail entry indicator on a tail entry indicator output coupled to each of the plurality of content-addressable entries indicating a valid tail entry ID of a first content-addressable entry of the plurality of content-addressable entries whose resource ID matched the input resource ID and being the tail entry in the linked list associated with the input resource ID; and allocate a new content-addressable entry for the input resource ID in a free content-addressable entry among the plurality of content-addressable entries;

in response to the global output tail entry indicator indicating the valid tail entry ID of the first content-addressable entry:

associate the new content-addressable entry with the input resource ID;

associate the new content-addressable entry as the tail entry in the linked list associated with the input resource ID; and associate the new content-addressable entry to be dependent on the first content-addressable entry; and the first content-addressable entry, in response to the content-addressable entry being indicated as the first content-addressable entry in the global output tail entry indicator:

disassociate the first content-addressable entry as being the tail entry in the linked list associated with the input resource ID.

* * * * *